(12) United States Patent
Hattori et al.

(10) Patent No.: US 7,696,996 B2
(45) Date of Patent: Apr. 13, 2010

(54) LASER SCANNING MICROSCOPE APPARATUS

(75) Inventors: Toshiyuki Hattori, Tokyo (JP); Mitsuhiro Nakano, Tokyo (JP); Yusuke Yamashita, Tokyo (JP); Hiroshi Hirayama, Tokyo (JP); Tatsuo Nakata, Tokyo (JP)

(73) Assignee: Olympus Corporation, Tokyo (JP)

( * ) Notice: Subject to any disclaimer, the term of this patent is extended or adjusted under 35 U.S.C. 154(b) by 463 days.

(21) Appl. No.: 11/294,689

(22) Filed: Dec. 5, 2005

(65) Prior Publication Data

US 2006/0129353 A1  Jun. 15, 2006

(30) Foreign Application Priority Data

Dec. 13, 2004 (JP) ............................. 2004-360604
Jun. 1, 2005 (JP) ............................. 2005-161447
Jun. 2, 2005 (JP) ............................. 2005-162433

(51) Int. Cl.
*G06T 11/20* (2006.01)

(52) U.S. Cl. ............................. 345/440; 715/700; 850/21

(58) Field of Classification Search ................ 345/440; 850/21; 715/700; 348/79
See application file for complete search history.

(56) References Cited

U.S. PATENT DOCUMENTS

| 6,011,562 A * | 1/2000 | Gagne et al. ................. 345/473 |
| 6,416,959 B1 * | 7/2002 | Giuliano et al. ................ 435/7.2 |
| 7,546,210 B2 * | 6/2009 | Callahan et al. ................. 702/19 |
| 2002/0053639 A1 * | 5/2002 | Katsumata et al. ............ 250/311 |
| 2002/0083413 A1 | 6/2002 | Kodosky et al. |
| 2003/0030902 A1 * | 2/2003 | Fukushima et al. ........... 359/388 |
| 2003/0161515 A1 * | 8/2003 | Salmon et al. ............... 382/128 |
| 2004/0029213 A1 * | 2/2004 | Callahan et al. ............. 435/40.5 |
| 2005/0231512 A1 * | 10/2005 | Niles et al. ................... 345/473 |
| 2005/0256654 A1 | 11/2005 | Salmon et al. |

FOREIGN PATENT DOCUMENTS

EP  1 146 480 A1  10/2001
JP  2003-172877 A  6/2003

OTHER PUBLICATIONS

"LabView User Manual" Jan. 1998, National Instruments, XP002372700, Retrieved from the Internet: URL:http://tfcg.elis.ugent.be/student/Lvus er.pdf>, Retrieved on Mar. 15, 2006, pp. 1-1 to 1-9; p. 2-1; pp. 3-1 to 3-27; p. 4-1.
Wier, W.G. et al., "A Custom Confocal and Two-photon Digital Laser Scanning Microscope" Am J. Physiol Heart Circ Physiol, vol. 278, 2000, pp. H2150-H2156, XP002372684.
Collier, Tom, et al., "Near Real-Time confocal Microscopy of Amelanotic Tissue" Academic Radiology, vol. 9, No. 5. May 2002, pp. 504-512, XP002372685.
Meissner, H., "Lichtmikorskopie Geht Online" F & M Feinwerktechnik Mikrotechnik Mikroelektronik, Hanser, Munchen, DE, vol. 104, No. 3, Mar. 1, 1996, pp. 183-184, XP000581588, ISSN: 1437-9503.

* cited by examiner

*Primary Examiner*—Michelle K Lay
(74) *Attorney, Agent, or Firm*—Frishauf, Holtz, Goodman & Chick, P.C.

(57) ABSTRACT

A laser scanning microscope capable of quickly and accurately setting control values of control items for a microscope apparatus is provided. The control items and a time line are displayed along a vertical axis and a horizontal axis, respectively. The laser scanning microscope includes a graphical user interface configured to set the control values of the control items along the time line and a control unit configured to acquire luminance information of a specimen by irradiating the specimen with a laser beam in accordance with the control values set by the graphical user interface.

28 Claims, 31 Drawing Sheets

FIG. 6
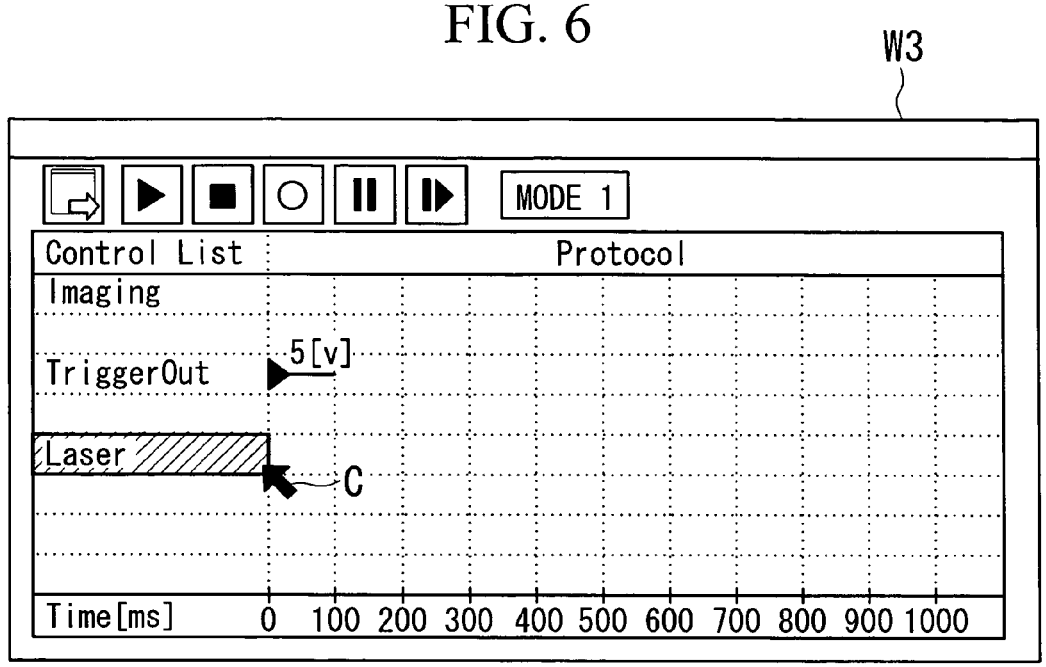
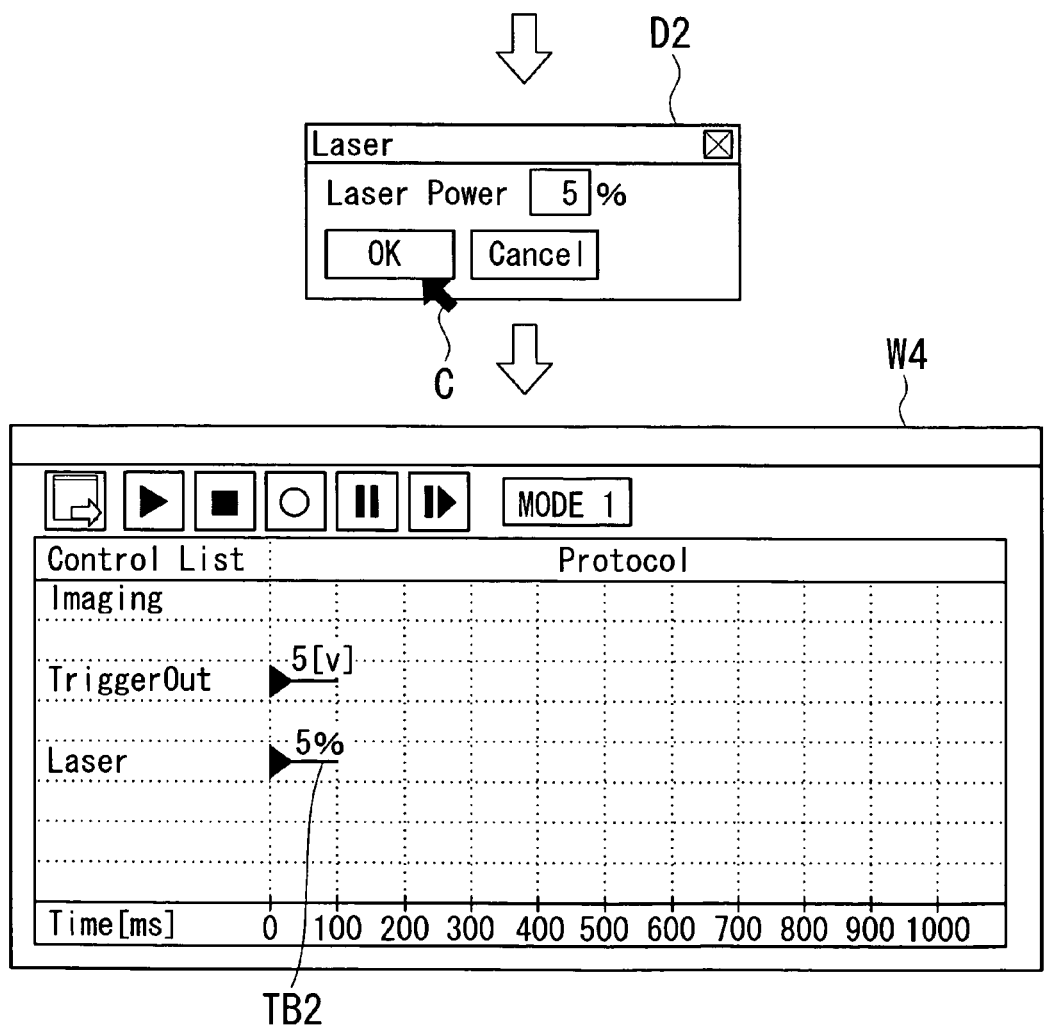

FIG. 8
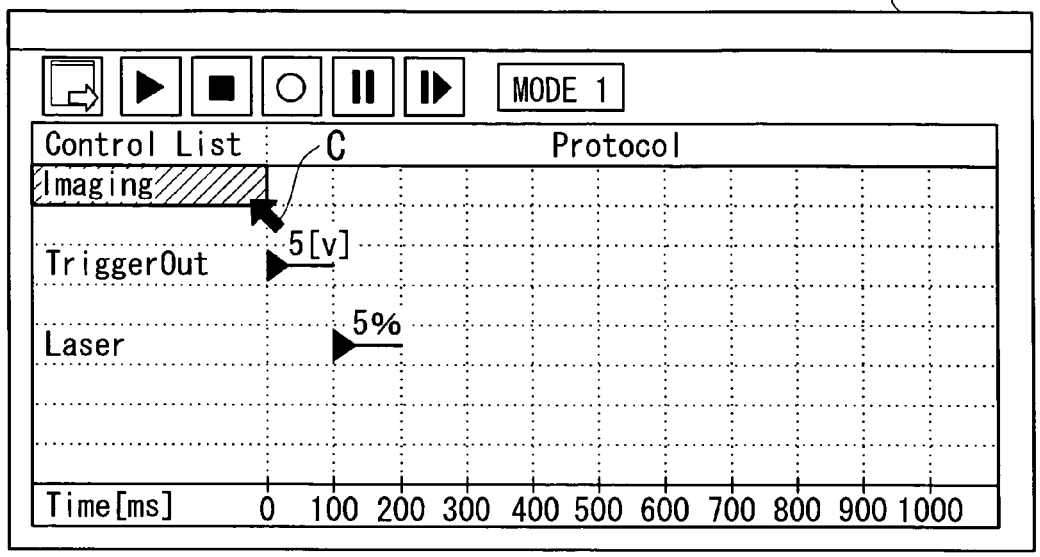
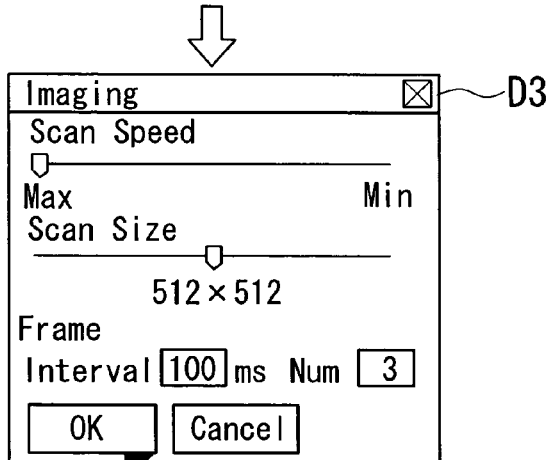
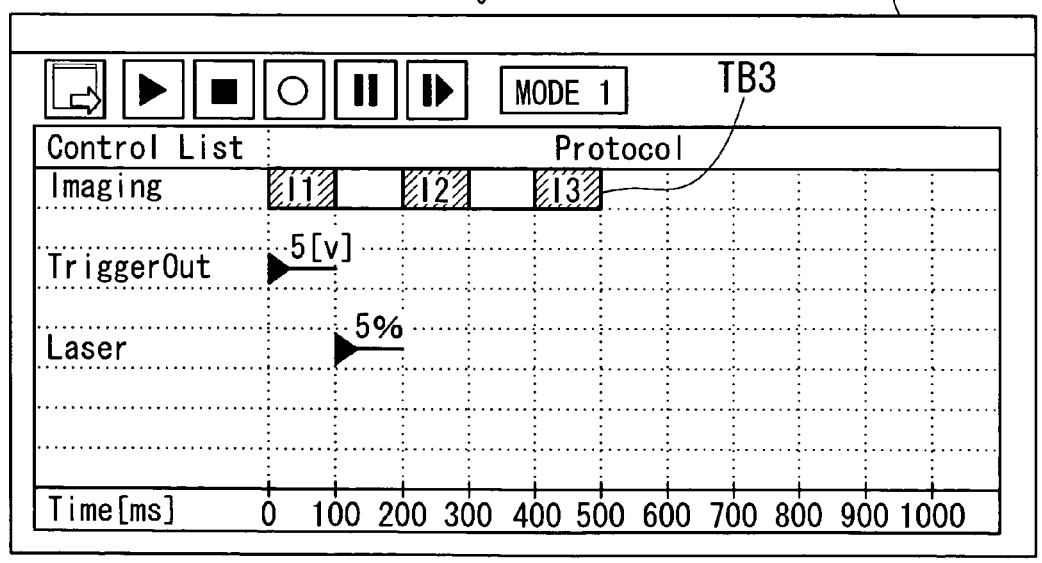

FIG. 10
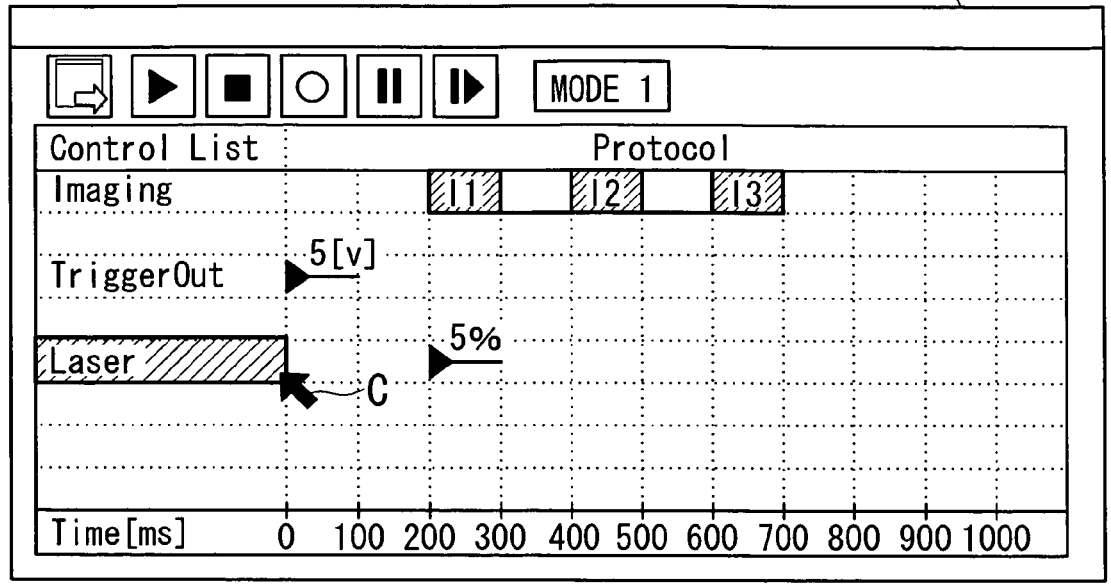
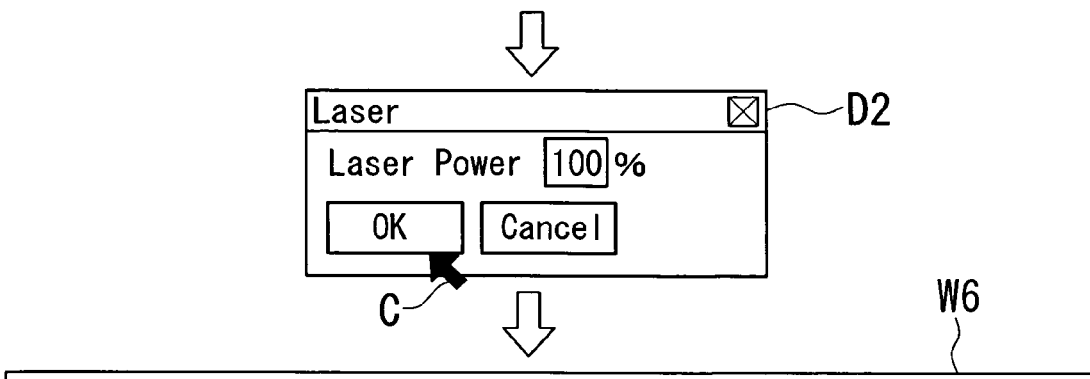
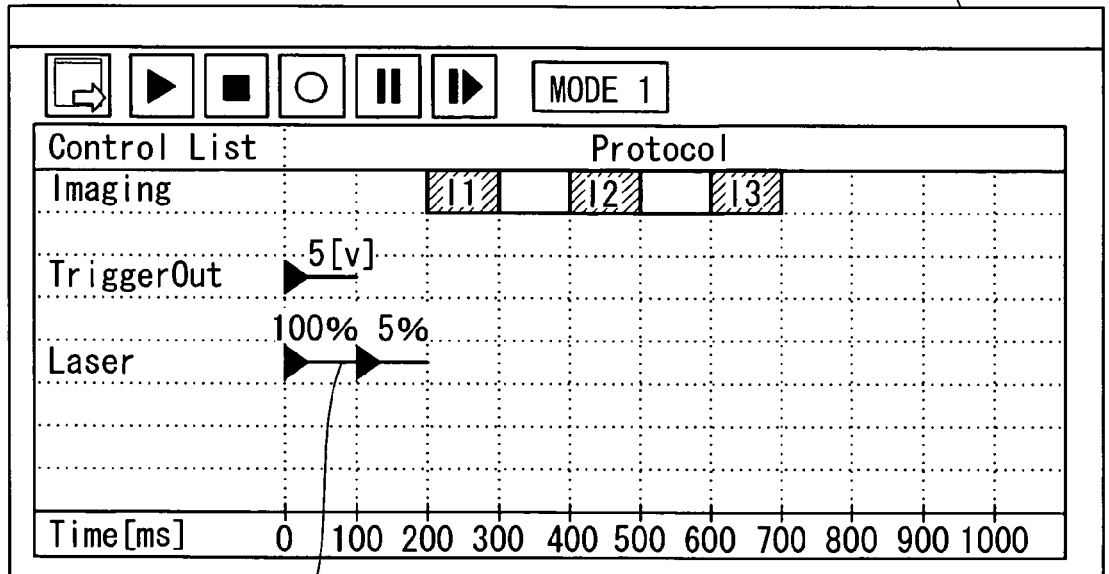

FIG. 13
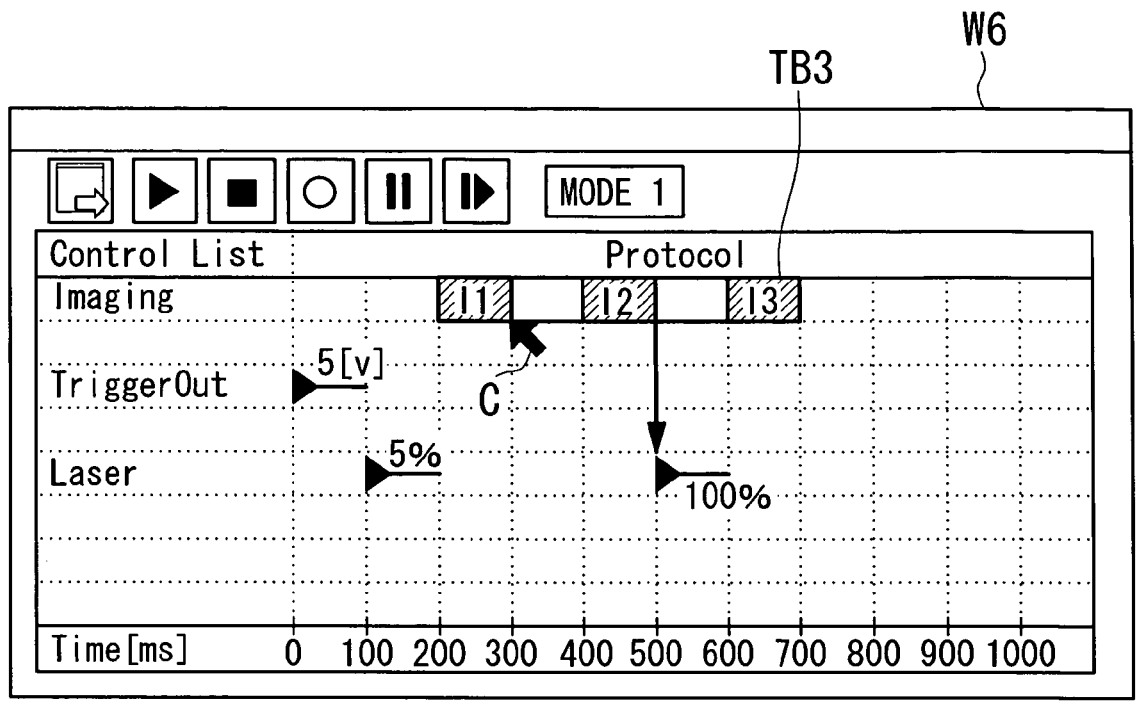
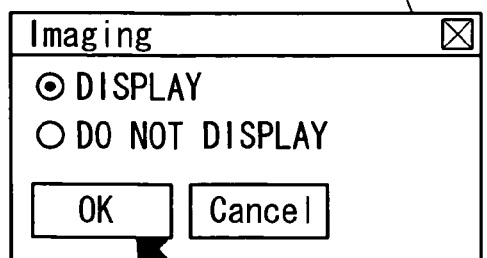

FIG. 14
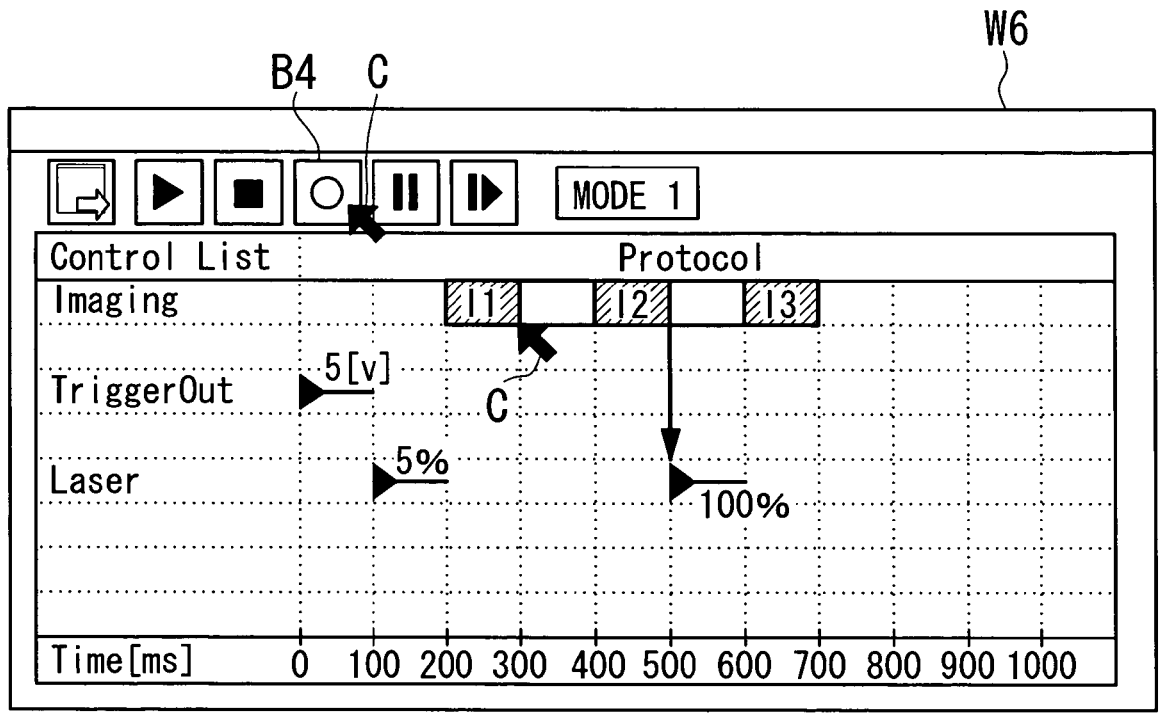
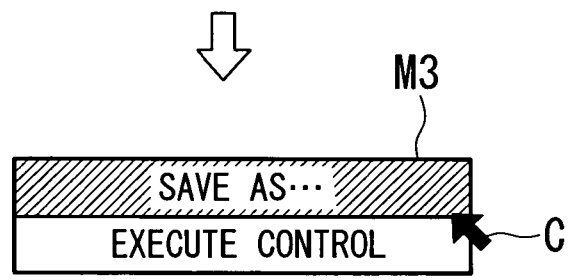
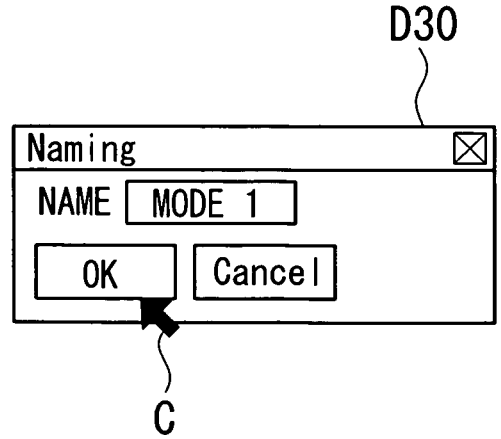

FIG. 18
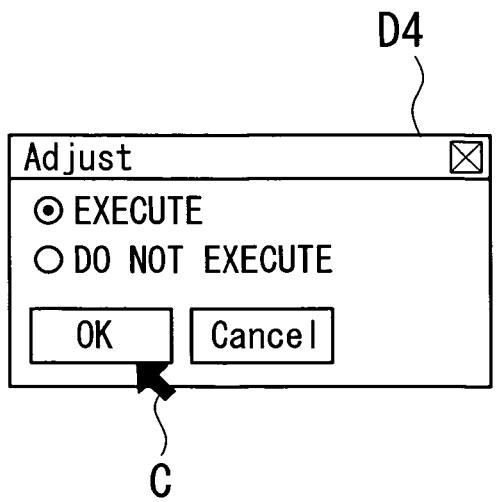
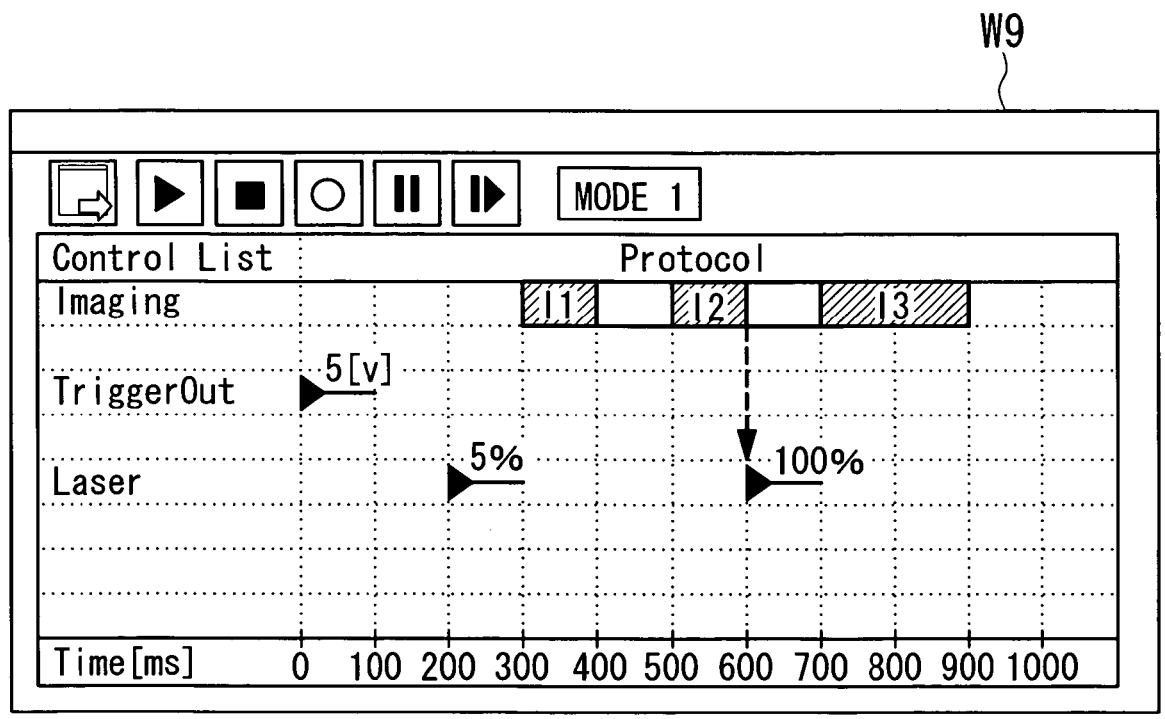

FIG. 32
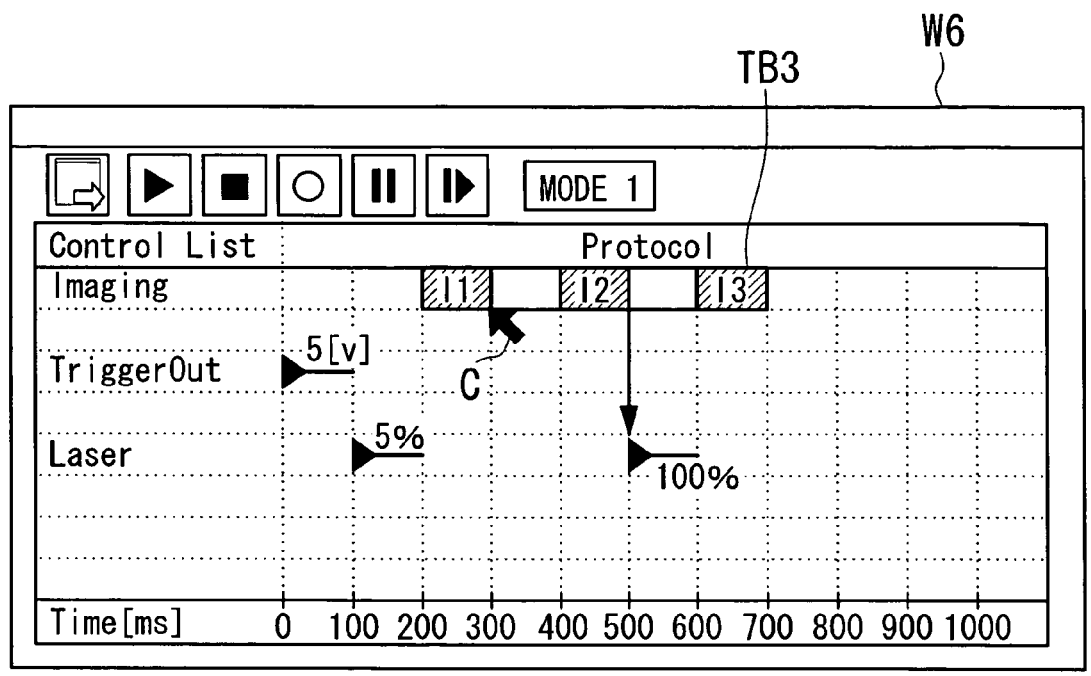
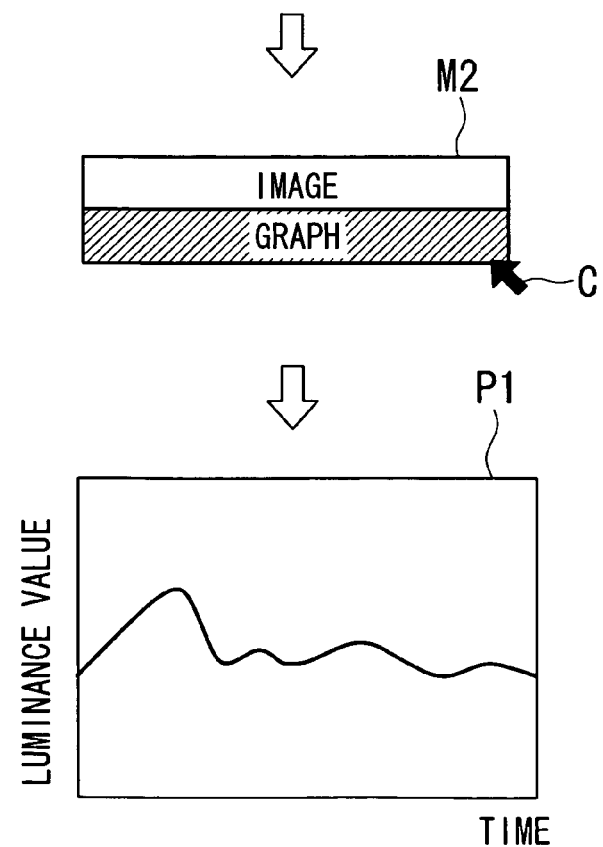

FIG. 35
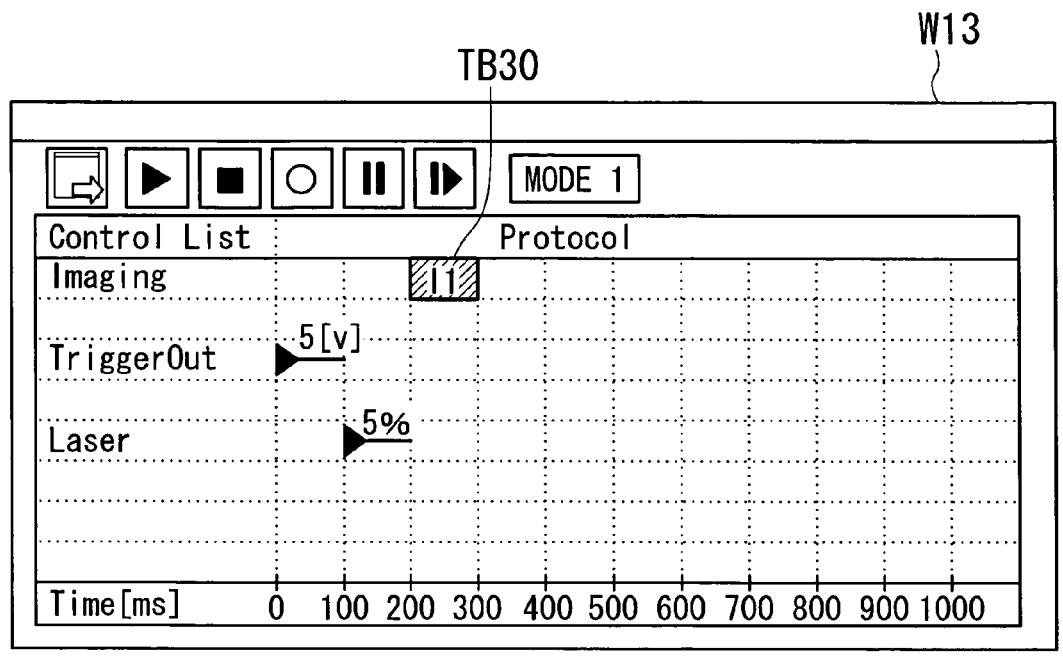
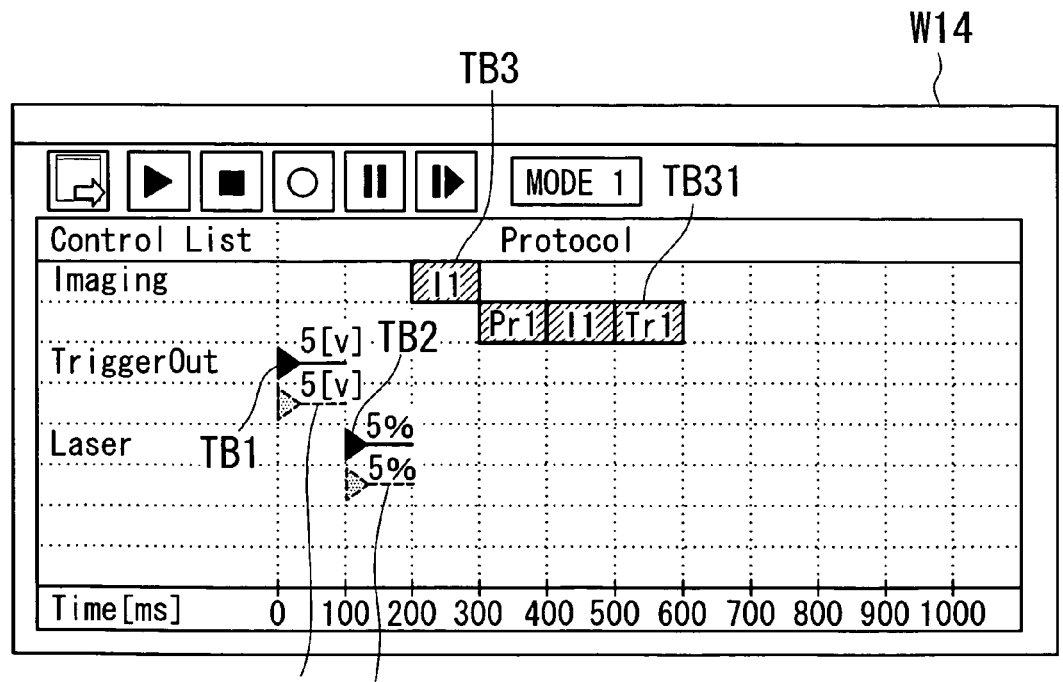

FIG. 36
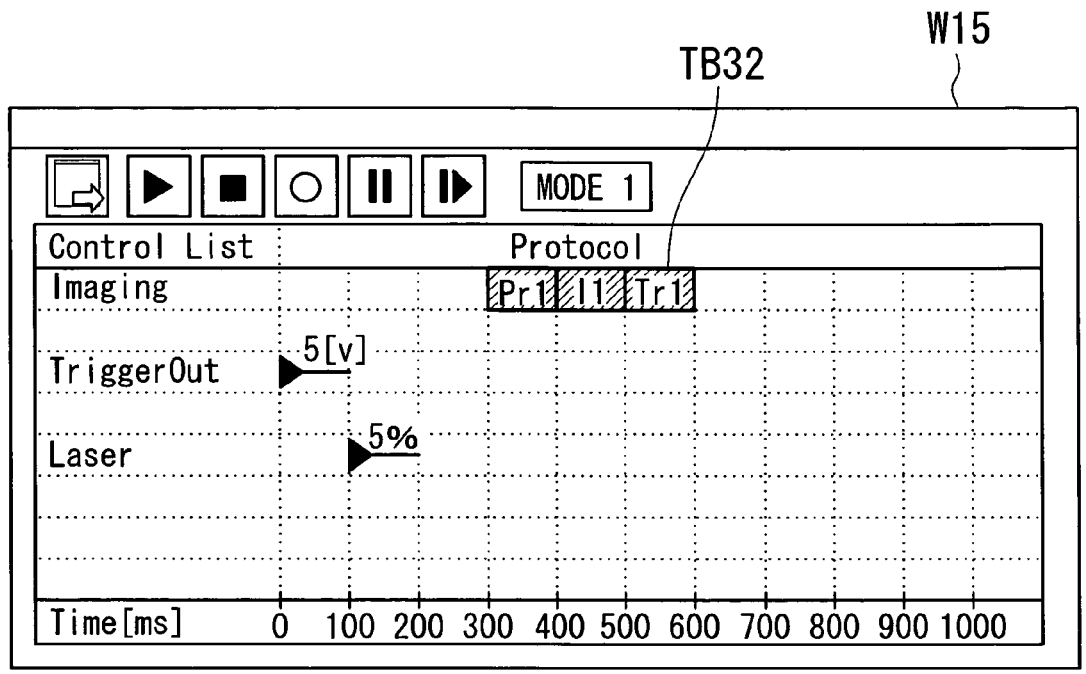
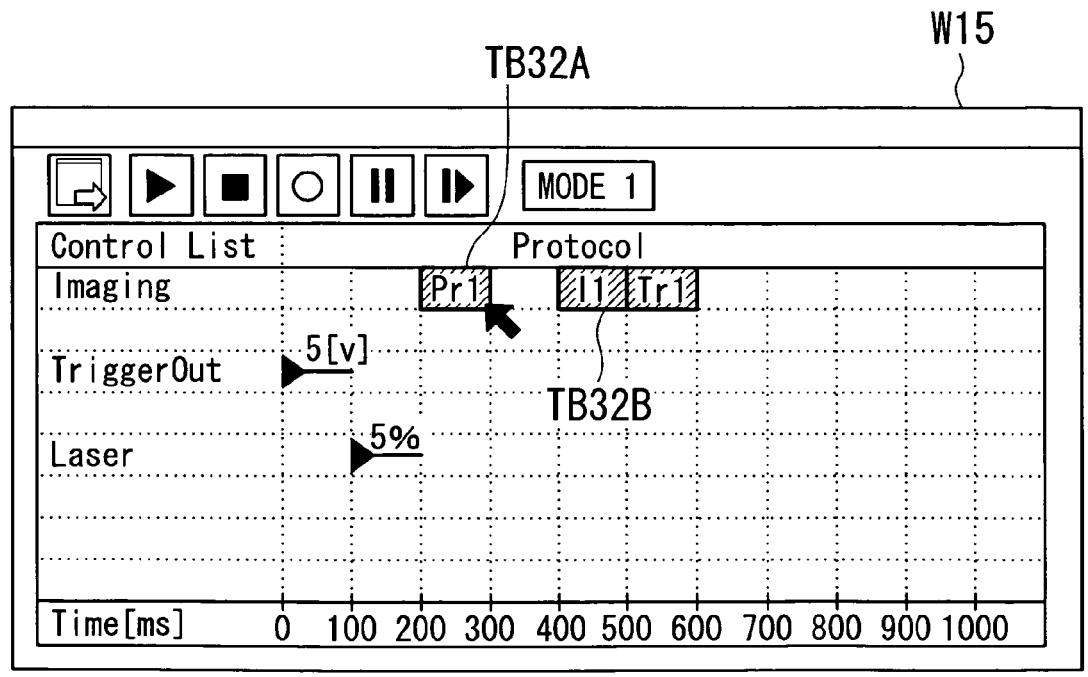

LASER SCANNING MICROSCOPE APPARATUS

BACKGROUND OF THE INVENTION

1. Field of the Invention

The present invention relates to a laser scanning microscope apparatus configured to irradiate a specimen with a laser beam and obtain luminance information about the specimen.

This application is based on Japanese Patent Applications Nos. 2004-360604, 2005-161447, and 2005-162433, the contents of which are incorporated herein by reference.

2. Description of Related Art

Conventionally, a laser scanning microscope apparatus has been used to irradiate a specimen with a laser beam and obtain luminance information about the specimen in the form of an image. In general, such a laser scanning microscope apparatus is controlled by a computer by executing an application program. The application program requires a complicated process for setting control values for various control items. Accordingly, a laser scanning microscope apparatus that allows control items to be set through a relatively simple input process has been proposed (Japanese Unexamined Patent Application Publication No. 2003-172877).

However, the input process for the laser scanning microscope apparatus described in Japanese Unexamined Patent Application Publication No. 2003-172877 is only capable of determining the execution order of the control items to be set to establish an experimental procedure based on a combination of control values of the control items.

BRIEF SUMMARY OF THE INVENTION

The present invention provides a scanning laser microscope configured to quickly and accurately set the chronological relationship between control values for control items.

The present invention provides a laser scanning microscope apparatus including a graphical user interface (GUI) configured to display control items and a time line along a vertical axis and a horizontal axis, respectively, and to set control values for the control items along the time line and a control unit configured to carry out control to obtain luminance information of a specimen by irradiating the specimen with a laser beam in accordance with the control values set using the graphical user interface.

According to the present invention, through the operation of the GUI, the control items and the time line are displayed along the horizontal axis and the vertical axis. Therefore, when the user sets the control values of each control item, the user can easily set the control values along the time line while recognizing the chronological relationship between the control items.

Accordingly, the control values of each control item can be set quickly and accurately, and, in particular, the chronological relationship between the control items can be easily grasped.

According to the present invention, the graphical user interface may include a table storing the processing time for each of the control items, and the processing times of the control items corresponding to the set control values may be read out from the table and set.

According to the present invention, the graphical user interface may include a time-display setting unit configured to display the setting for at least one of a time scale of the time line and a screen display scale in the direction of the time line, wherein the setting is modifiable.

According to the present invention, the graphical user interface may include a laser setting unit configured to display the setting for a laser control value including at least one of an output intensity of the laser beam and emission time, wherein the setting is modifiable.

According to the present invention, the graphical user interface may include an image setting unit configured to display the setting for an image-acquisition control value including at least an image acquisition time for acquiring the image information, wherein the setting is modifiable.

The laser scanning microscope apparatus according to the present invention may further include an image information display area configured to display image information, wherein the graphical user interface links the image information display area and the image-acquisition control value and displays image information related to the image-acquisition control value when the image-acquisition control value is assigned.

According to the present invention, the graphical user interface may include an actual-control-value acquisition unit configured to acquire an actual control value of a set control value at execution time and an actual-control-value display unit configured to display the acquired actual control value.

According to the present invention, the graphical user interface may include a correction unit configured to correct a set control value on the basis of the actual control value acquired by the actual-control-value acquisition unit.

According to the present invention, the actual control value display unit may separate the actual control value into detailed actual control values and display the detailed actual control values, and the correction unit may set the detailed actual control values as individual control values.

According to the present invention, the graphical user interface may include an execution mode for executing the control values by connecting to an object to be actually controlled and an edit mode for setting the control values without connecting to an object to be actually controlled.

According to the present invention, the graphical user interface may include an actual-time display unit configured to display the actual elapsed time when executing the object to be actually controlled.

According to the present invention, the graphical user interface may display a preparation period and a completion period when executing a control value.

According to the present invention, the graphical user interface may separate at least one of the preparation period and the completion period from the processing time of the control value.

According to the present invention, the graphical user interface may separate at least one of the preparation period and the completion period from the processing time of a control value.

According to the present invention, the graphical user interface may display the image-acquisition control value, including at least an image acquisition time for acquiring the image information, as a task bar having a length that is changeable by dragging with a mouse, and the number of frames to be acquired may be increased or decreased without changing other set control values.

According to the present invention, the graphical user interface may include a pausing unit configured to pause a control operation of the control unit after the control operation is started, a restart-time setting unit configured to set the restart time of the control operation, and a restart unit configured to restart the control operation at the restart time set by the restart-time setting unit.

In this way, if the control operation has to be stopped for some reason due to the condition of the specimen after the control operation is started by the control unit in accordance with the control values set by the GUI, the control operation can be paused by operating the pausing unit.

In such a case, since a restart-time setting unit is provided, the control operation paused by the control unit can be restarted at a timing other than the time the control operation was paused. In this way, the restart time can be postponed, depending on a change in the specimen, to skip set control values, and the restart time can be returned to re-execute a control item that has already been carried out.

According to the above-described structure, the control values of the control items can be quickly and accurately set and, in particular, their chronological relationship can be grasped.

According to the present invention, the graphical user interface may include an editing unit configured to change the control values when the pausing unit is pausing the control operation.

By operating the editing unit, the control values can be modified during pausing, and luminance information about the specimen can be acquired under conditions suitable for the change in the specimen.

According to the present invention, it is preferable for the graphical user interface to display a pause position indicator showing at least the pause position of a control operation paused by the pausing unit on the display of the control values set along the time line.

In this way, the pause position indicator is displayed by the GUI, and the user can recognize the status of the control on the basis of the pause position indicator. Accordingly, a suitable restart time can be set or the control values can be changed to suitable values.

According to the present invention, the graphical user interface may include pausing as a control item.

In this way, the pause position can be set in advance before the execution of the control operation by the control unit. Accordingly, pausing is possible at a predetermine time even when the status is not constantly monitored during the execution of the control operation.

According to the present invention, the control unit may carry out control for starting the processing of a control value in synchronization with the completion of the processing of the previous control value, wherein the control value and the previous control value are included in the control values set by the graphical user interface and correspond to a control item whose processing time is difficult to estimate in advance.

Since the control values are set along the time line by the GUI, the execution of the control values by the control unit is carried out in time. However, depending on the control item, the time required for its processing may not be estimatable in advance. For example, when a large amount of complicated calculation is required for the processing, the processing time may change depending on the status of the processing device.

In such a case, the control unit starts the processing of a control value in synchronization with the completion of the processing of the previous control value, whose processing time is difficult to estimate in advance. Therefore, the processing is not interrupted when the processing takes time or processing of a control value is not started while another control value is being processed, and, thus, all control values can be executed in order. In particular, this is advantageous when processing a control value by using the processing result of the previous control value.

By employing such a configuration, extra time is not required to provide allowance for the settings when setting the control values with the GUI and prevents dead time from occurring between processing of adjacent control values. In this way, effective processing can be carried out.

According to the above-described configuration, the control values of the control items can be quickly and accurately set, and, moreover, the chronological relationship between the control values can be easily grasped. Furthermore, for processing of a control value whose processing time is difficult to estimate, the processing can be carried out without any time loss.

According to the present invention, it is preferable that, when one control value corresponding to the control item whose processing time is difficult to estimate in advance is set, the graphical user interface displays a time line having a start point at the completion time of that control value so as to set other control values to be processed after that control value.

In this way, even if the accurate processing time of one of the control values is unknown, the settings of the subsequent control values can be easily carried out.

In such a case, it is preferable that the graphical user interface acquire an actual processing time after executing processing and redisplay all control values in a time scale whose start point is the processing start time.

According to the present invention, the control unit may carry out control for starting the processing of a control value without being in synchronization with the completion of the processing of the previous control value, wherein the control value and the previous control value are included in the control values set by the graphical user interface and correspond to a control item whose processing time is difficult to estimate in advance.

In this way, when the time required for processing cannot be estimated in advance, the processing of the subsequent control values is started without being in synchronization with the completion of processing of the control value whose processing time cannot be estimated in advance. Therefore, the processing of the subsequent control values can be carried out without waiting for the completion of processing of the control value whose processing time cannot be estimated. In this way, if a processing result is not used for the processing of a subsequent control value, the generation of unnecessary waiting time is prevented and the processing can be carried out effectively at a set time.

Another aspect of the present invention provides a method for setting a control value of a scanning laser microscope that is configured to acquire luminance information of a specimen by irradiating the specimen with a laser beam, the method including the steps of displaying control items and a time line along the vertical axis and the horizontal axis, respectively, and setting control values for the control items along the time line.

Another aspect of the present invention provides a program for setting control values of a scanning laser microscope configured to acquire luminance information of a specimen by irradiating the specimen with a laser beam for instructing a computer to execute the steps of displaying control items and a time line along the vertical axis and the horizontal axis, respectively, and setting control values for the control items along the time line.

Another aspect of the present invention provides a method for controlling a scanning laser microscope including the steps of displaying control items and a time line along the vertical axis and the horizontal axis, respectively, setting control values for the control items along the time line, and obtaining luminance information of a specimen by irradiating the specimen with a laser beam in accordance with the control values set using the graphical user interface, wherein the control unit carries out control for starting the processing of a control value in synchronization with the completion of the processing of the previous control value, and the control value and the previous control value are included in the set control values and corresponding to a control item whose processing time is difficult to estimate in advance.

Another aspect of the present invention provides a method for controlling a scanning laser microscope including the steps of displaying control items and a time line along the vertical axis and the horizontal axis, respectively, setting control values for the control items along the time line, and obtaining luminance information of a specimen by irradiating the specimen with a laser beam in accordance with the control values set using the graphical user interface, wherein the control unit carries out control for starting the processing of a control value without being in synchronization with the completion of the processing of the previous control value, and the control value and the previous control value are included in the set control values and correspond to a control item whose processing time is difficult to estimate in advance.

Another aspect of the present invention provides a control program for controlling a scanning laser microscope to display control items and a time line along the vertical axis and the horizontal axis, respectively, setting control values for the control items along the time line, and obtaining luminance information of a specimen by irradiating the specimen with a laser beam in accordance with the control values set using the graphical user interface, wherein the control program instructs a computer to execute the steps of determining whether a set control value is a control value corresponding to a control item whose processing time is difficult to estimate in advance, and carrying out control for starting the processing of a control value in synchronization with the completion of the processing of the previous control value, wherein the control value and the previous control value are included in the set control values.

Another aspect of the present invention provides a control program for controlling a scanning laser microscope to display control items and a time line along the vertical axis and the horizontal axis, respectively, setting control values for the control items along the time line, and obtaining luminance information of a specimen by irradiating the specimen with a laser beam in accordance with the control values set using the graphical user interface, wherein the control program instructs a computer to execute the steps of determining whether a set control value is a control value corresponding to a control item whose processing time is difficult to estimate in advance, and carrying out control for starting the processing of a control value without being in synchronization with the completion of the processing of the previous control value, wherein the control value and the previous control value are included in the set control values.

BRIEF DESCRIPTION OF THE SEVERAL VIEWS OF THE DRAWINGS

FIG. 6 illustrates a process for setting another control item in the setting window of the control setting screen shown in FIG. 5.

FIG. 8 illustrates a process for setting another control item in the setting window of the control setting screen shown in FIG. 7.

FIG. 10 illustrates a process for setting another control item in the setting window of the control setting screen shown in FIG. 9.

FIG. 13 illustrates a process carried out in the setting window shown in FIG. 12 for turning an image display on or off.

FIG. 14 illustrates a process carried out in the setting window in FIG. 12 for naming a group of control values.

FIG. 18 illustrates an adjustment process for changing the set control values to the actual control values shown in FIG. 17.

FIG. 32 illustrates selection of a method of displaying image information according to a first modification of an embodiment of the present invention.

FIG. 35 illustrates an example of a setting window according to a third modification of an embodiment of the present invention, wherein a pre-processing time and a post-processing time are separated and acquired as actual control values.

FIG. 36 illustrates an example of a setting window after adjustment processing of control values has been carried out on the actual control values in the setting window shown in FIG. 35.

DETAILED DESCRIPTION OF THE INVENTION

A laser scanning microscope apparatus according to an embodiment of the present invention will be described in detail below with reference to the drawings.

Embodiment

Figure 1:
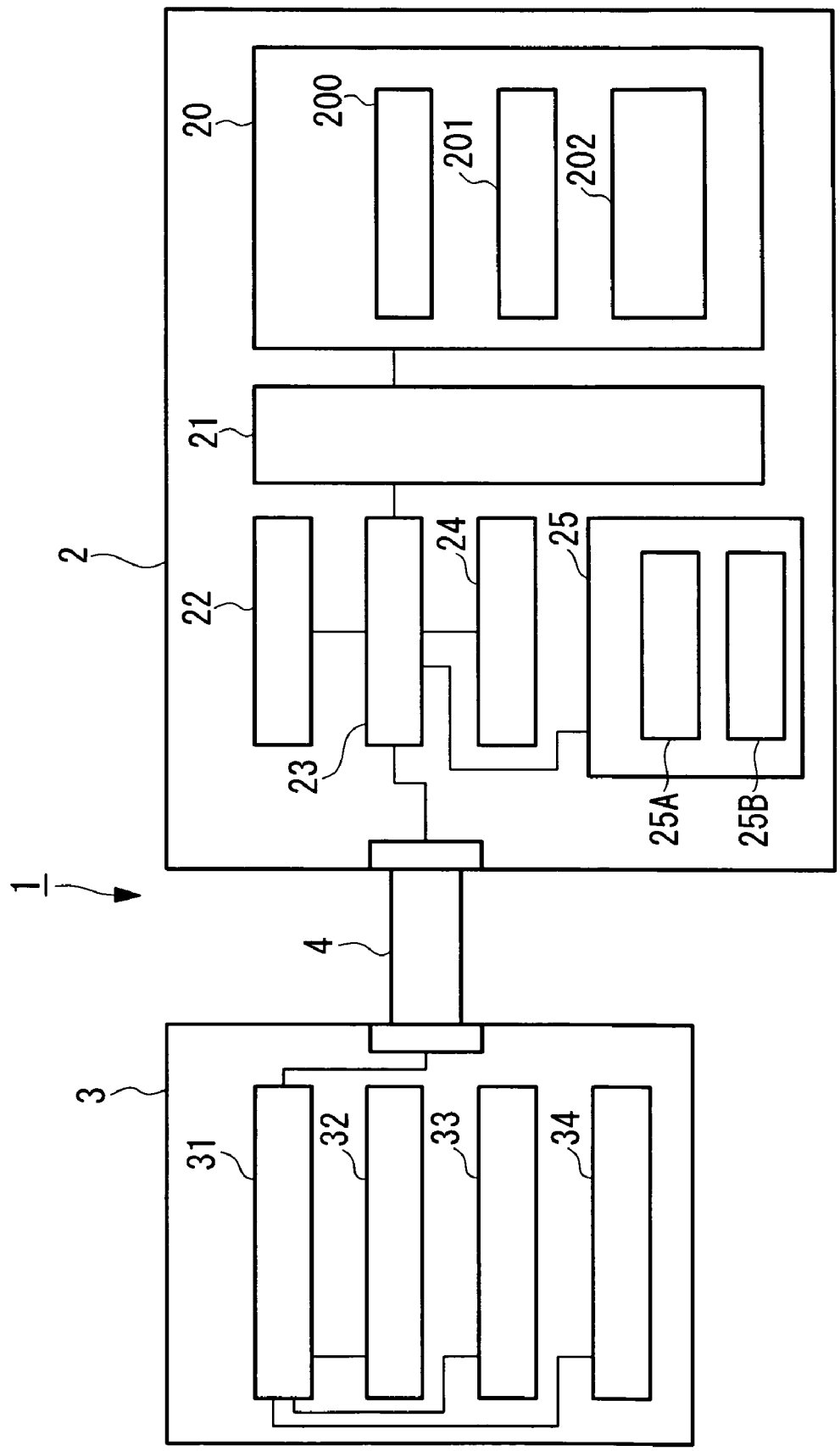
FIG. 1 is a block diagram illustrating the overall structure of a laser scanning microscope apparatus according to an embodiment of the present invention.

FIG. 1 is a block diagram illustrating the overall structure of a laser scanning microscope apparatus 1 according to an embodiment of the present invention. As shown in FIG. 1, the laser scanning microscope apparatus 1 includes a computer 2 and a microscope apparatus 3 that are connected to each other via an interface 4. The computer 2 controls the microscope apparatus 3 via the interface 4.

The computer 2 includes an operating system (OS) 21 that is executed by a central processing unit (CPU) 23 and an application program 20 runs on the OS 21. The application program 20 has a graphical user interface (GUI) 200, a processing unit 201, and a microscope-apparatus control unit 202.

The GUI 200 operates in conjunction with a screen so as to allow the user to set control values of the microscope apparatus 3. More specifically, the GUI 200 displays control items for the microscope apparatus 3 along the vertical axis of the screen and a time line along the horizontal axis of the screen so that control values of the control items can be set along the time line.

The processing unit 201 generates a control table on the basis of the control values set via the GUI 200. The microscope-apparatus control unit 202 controls the operation of the microscope apparatus 3 on the basis of at least the control table generated by the processing unit 201. The computer 2 includes a monitor 22 configured to display at least image information obtained from the microscope apparatus 3, a recording medium 24 configured to store various types of information, including the control values set via the GUI 200, and an input unit 25 realized by a mouse 25A and a keyboard 25B used for inputting at least the control values in accordance with the screens displayed by the GUI 200 on the monitor 22.

The microscope apparatus 3 includes a control unit 31 configured to receive a control command from the computer 2 via the interface 4, to control the various units included in the microscope apparatus 3 on the basis of the received control command and to send the control results to the computer 2. More specifically, the control unit 31 controls a laser unit 34 configured to emit a laser beam, a scanning unit 32 configured to scan a specimen with the laser beam, and a microscope unit 33 configured to irradiate a specimen with the laser beam and receive light emitted from the specimen.

First, the overall operation of the laser scanning microscope apparatus 1 will be described. The GUI 200 allows setting of a control value for each control item via the input unit 25. Then, the processing unit 201 generates a control table in accordance with the control values set via the GUI 200. The microscope-apparatus control unit 202 sends control commands for controlling the microscope apparatus 3 on the basis of the control table to the control unit 31 of the microscope apparatus 3 via the CPU 23 and the interface 4. The control unit 31 controls the scanning unit 32, the microscope unit 33, and the laser unit 34 on the basis of these control commands and sends the control results of controlling these units to the application program 20 via the interface 4 and the CPU 23. The application program 20 displays the control results or the progress of the control operation on the monitor 22.

Figure 2:
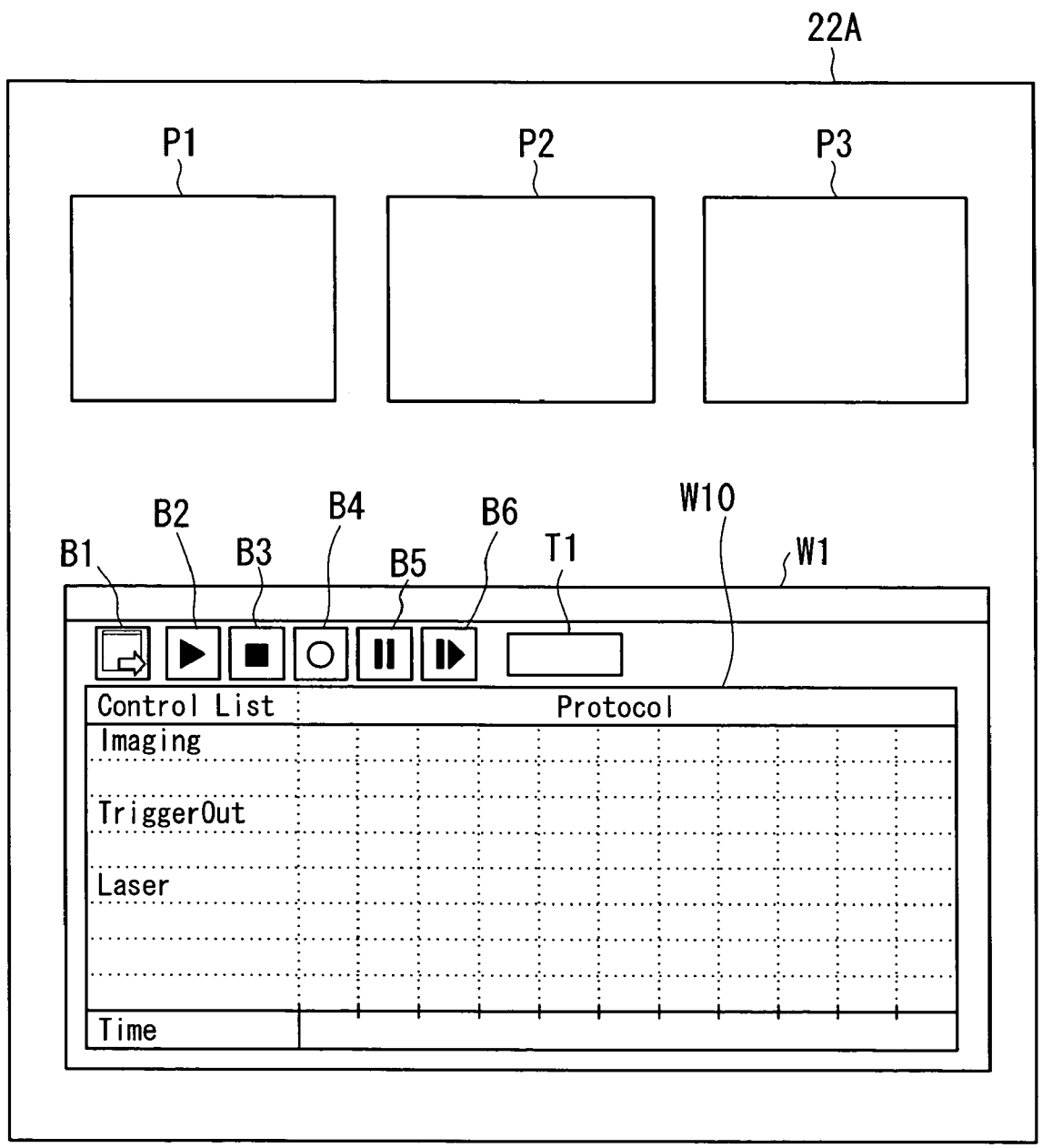
FIG. 2 illustrates an example setting window of a control setting screen of the laser scanning microscope apparatus shown in FIG. 1.

Next, the procedure for using the GUI 200 will be described in detail. FIG. 2 illustrates a control setting screen 22A displayed on the monitor 22. The control setting screen 22A includes a window W1 configured by the GUI 200. Moreover, the control setting screen 22A includes pictures (image information display areas) P1, P2, and P3 where image information obtained by the microscope apparatus 3 is displayed. The window W1 includes a button B1 for converting a protocol (control settings) defining a series of processes for various control items set along the time line into an executable format, a button B2 for instructing the execution of a control process, a button B3 for stopping the control process, a button B4 for carrying out other settings, a pause button B5 for pausing execution of the control process, a resume button B6 for resuming the paused control process, a title bar T1 for displaying the name of the control settings, and a setting window W10 for displaying the control values of the control items.

The setting window W10 includes a "Control List" column including various control items along the vertical axis and a "Time" row representing time along the horizontal axis. In this way, the "Protocol" area of the setting window W10 represents the processes for the various control items, including time elements. More specifically, the "Control List" column includes the control items "Imaging" for controlling the acquisition of image information, "Trigger Out" for controlling the output of a trigger signal to an external device, and "Laser" for controlling the laser beam. The amounts of time required for executing these control items are measured in advance and are stored in the computer 2 as a time table.

Figure 3:
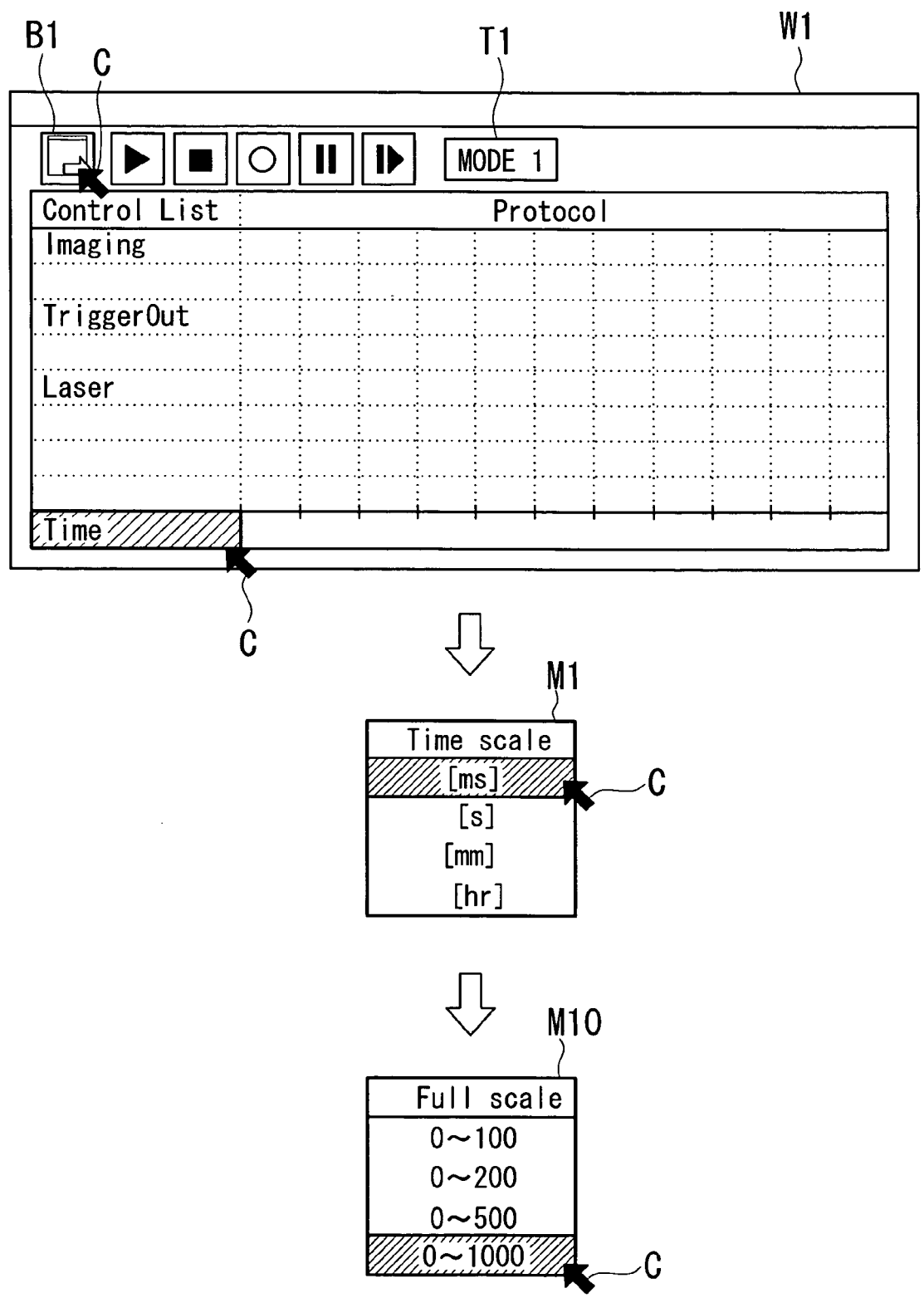
FIG. 3 illustrates a process for setting a time scale of the setting window of the control setting screen shown in FIG. 2.

The "Time" row displays a time line, as shown in FIG. 3. By double-clicking a cursor C on the "Time" area, a menu (time display setting unit) M1 is displayed. The menu M1 includes a "Time Scale" area, and below the "Time Scale" area, a plurality of time scales is displayed.

Figure 4:
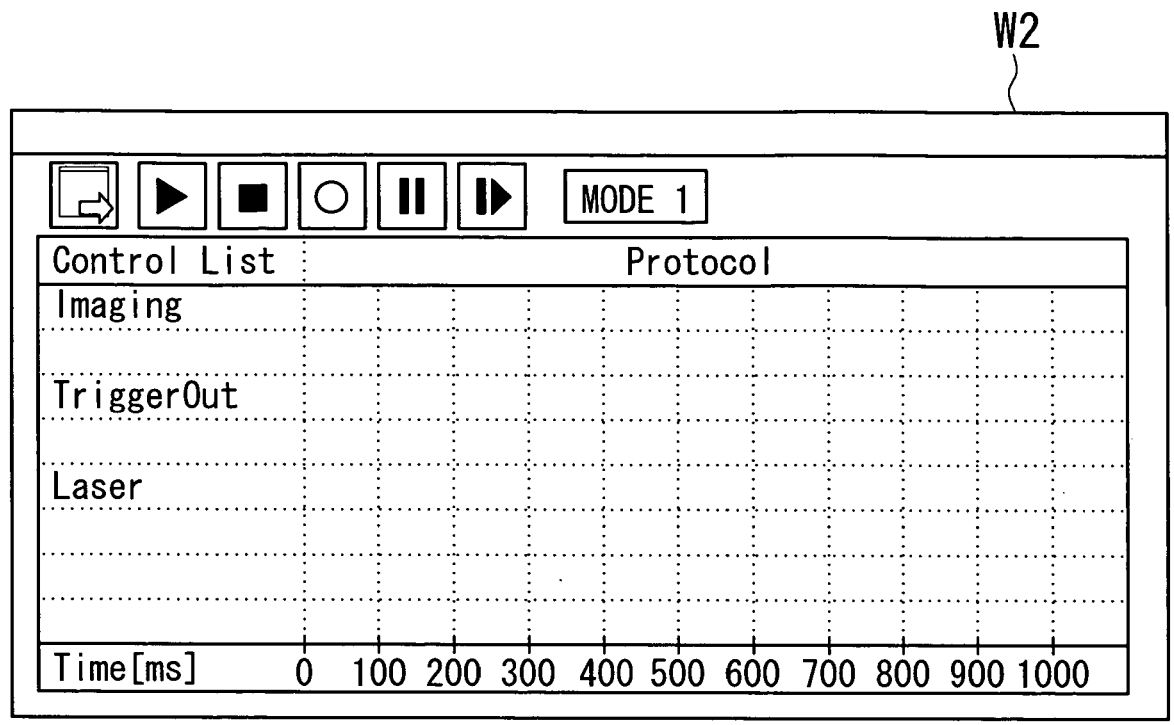
FIG. 4 illustrates the setting window shown in FIG. 3 with the time scale set.

Here, for example, if the time scale "[ms]" is selected, a menu M10 is displayed. The menu M10 includes a "Full Scale" area. Below the "Full Scale" area, a plurality of full scale values representing the scale of the area displayed above the time line is displayed. Here, for example, if "0-1000" is selected, the window W2, as shown in FIG. 4, is displayed. In the window W2, the characters "[ms]" representing a time unit are displayed, and a scale from 0 to 1,000 ms in 100 ms intervals is displayed. As shown in FIG. 3, a name for the control settings, "Mode 1", is input in the title bar T1. If a name for the settings is not input in the title bar T1, the user will be requested to input a name when, for example, saving the control values or executing the control items.

Figure 5:
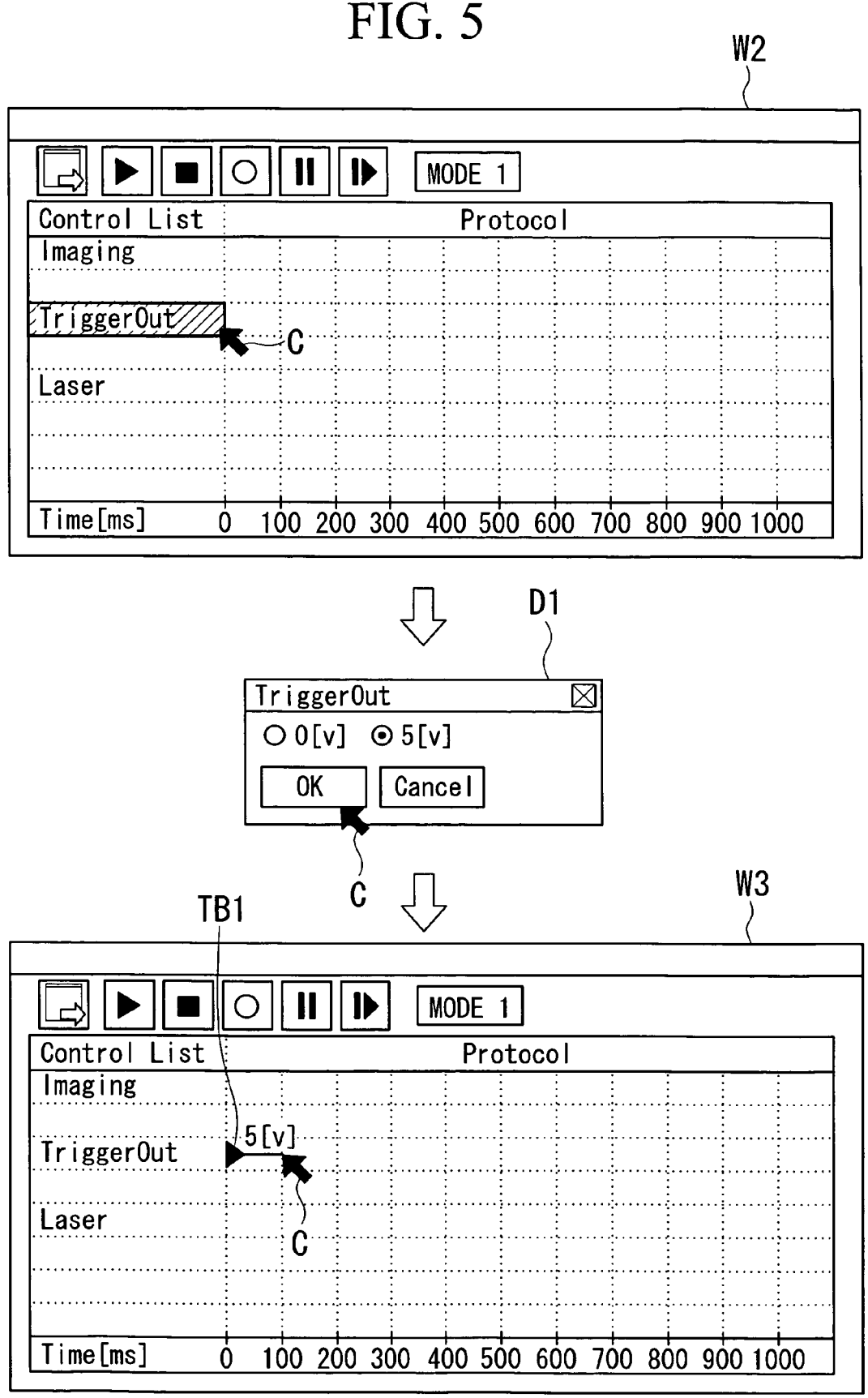
FIG. 5 illustrates a process for setting a control item in the setting window of the control setting screen shown in FIG. 4.

Next, a process for setting a control value for the control item "Trigger Out" will be described. As shown in FIG. 5, by double-clicking the cursor C on the "Trigger Out" area, a setting dialog D1 is displayed. In the setting dialog D1, voltage value selection buttons and an "OK" button for confirming the selection are displayed. Here, for example, if "5V" is selected and the "OK" button is clicked, the window W3 is displayed. In other words, an arrow-shaped task bar TB1 is displayed along the time line for the control item "Trigger Out" row. Then, the characters "5 [V]" are displayed above the task bar TB1. As a default setting, the task bar TB1 starts at 0 ms and extends to 100 ms along the time line. The task bar TB1 can be moved to a predetermined position by dragging and dropping the task bar TB1 along the time line. The left edge (leading edge) of the task bar TB1 represents the start of the processing of a trigger signal. The length of the task bar TB1 represents the amount of time required to complete this processing.

Figure 7:
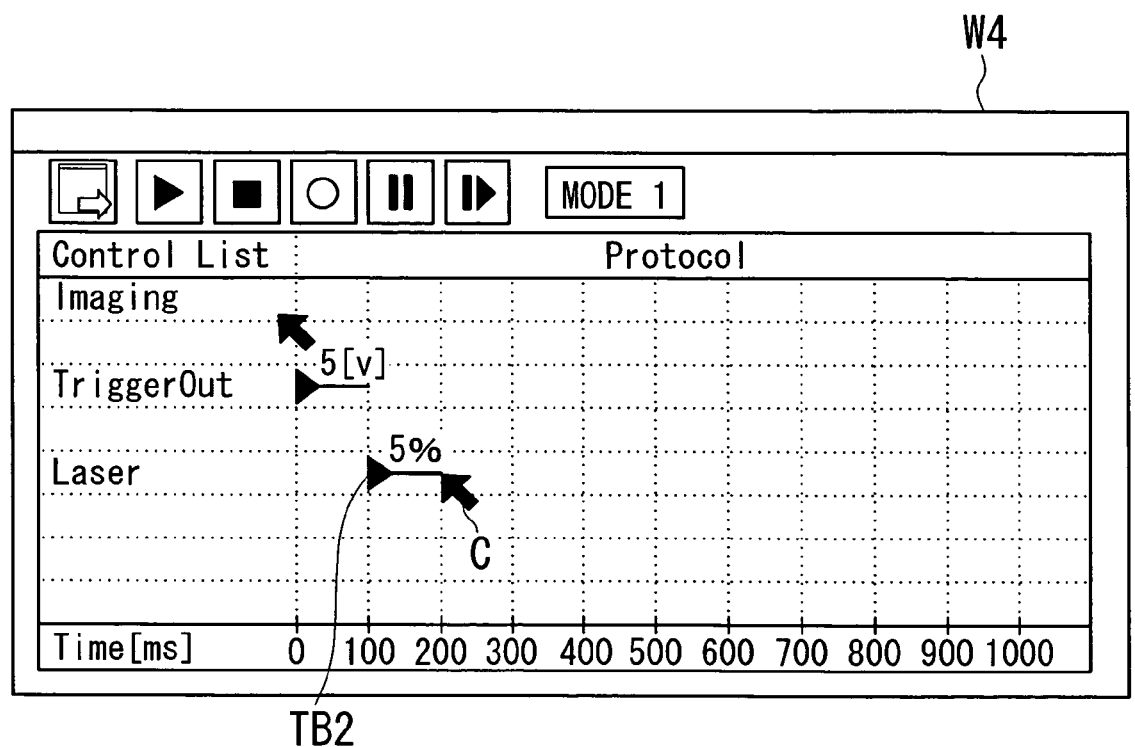
FIG. 7 illustrates the setting window shown in FIG. 6 with the control items set.

Next, the process for setting a control value for the control item "Laser" will be described. First, as shown in FIG. 6, by double-clicking the cursor C on the "Laser" area, a setting dialog (laser setting unit) D2 is displayed. The setting dialog D2 includes a "Laser Power" setting box for setting the laser beam output power and an "OK" button for confirming the laser beam output power setting. Here, for example, if the output is set to 5% by inputting the number "5" in the "Laser Power" setting box and the "OK" button is clicked, the window W4 is displayed. In other words, an arrow-shaped task bar TB2 is displayed along the time line of the control item "Laser". Then, the characters "5%" are displayed above the task bar TB2. As a default setting, the task bar TB2 starts at 0 ms and extends to 100 ms along the time line. The task bar TB2 can be moved to a predetermined position by dragging and dropping the task bar TB2 along the time line. In FIG. 7, the task bar TB2 at the default position, as shown in FIG. 6, is moved by 100 ms so that the starting point of the task bar TB2 is at 100 ms. Similar to the task bar TB1, the leading edge of the task bar TB2 represents the start of the processing of a laser output signal. The length of the task bar TB2 represents the amount of time required to complete this processing.

Next, the process for setting control values for the control item "Imaging" will be described. As shown in FIG. 8, by double-clicking the cursor C on the "Imaging" area, a setting dialog (image setting unit) D3 is displayed. The setting dialog D3 includes a "Scan Speed" slider for setting the acquisition speed of image information, a "Scan Size" slider for setting the size of the image information, an "Interval" setting box for setting the acquisition interval of the image information, a "Num" setting box for setting the number of image information frames to be acquired, and an "OK" button for confirming the settings. Here, for example, if the "Scan Speed" slider is set to "Max", the "Scan Size" slider is set to "512×512", "100" is input in the "Interval" setting box, and "3" is input in the "Num" setting box and, then, if the "OK" button is clicked, the window W5 is displayed. More specifically, a rectangular task bar TB3 having a starting point at 0 ms is displayed from 0 to 500 ms along the time line of the control item "Imaging". The task bar TB3 includes images I1, I2, and I3 indicating the acquisition timings of three images.

The images I1, I2, and I3 are linked together as a single group of control values. The default positions of these control values can be moved by dragging and dropping the task bar TB3 onto a predetermined position along the time line. Similarly, the length and intervals of the task bar TB3 can also be set by dragging and dropping. For example, when the length of the task bar TB3 is extended by dragging the right (trailing) edge of the task bar TB3, the number of frames to be acquired can be changed without changing the other control values, such as the intervals between the frames. Moreover, when the length of the task bar TB3 is extended by dragging the trailing edge of an interval displayed in the task bar TB3, the length of the intervals can be changed without changing the number of frames to be acquired.

Figure 9:
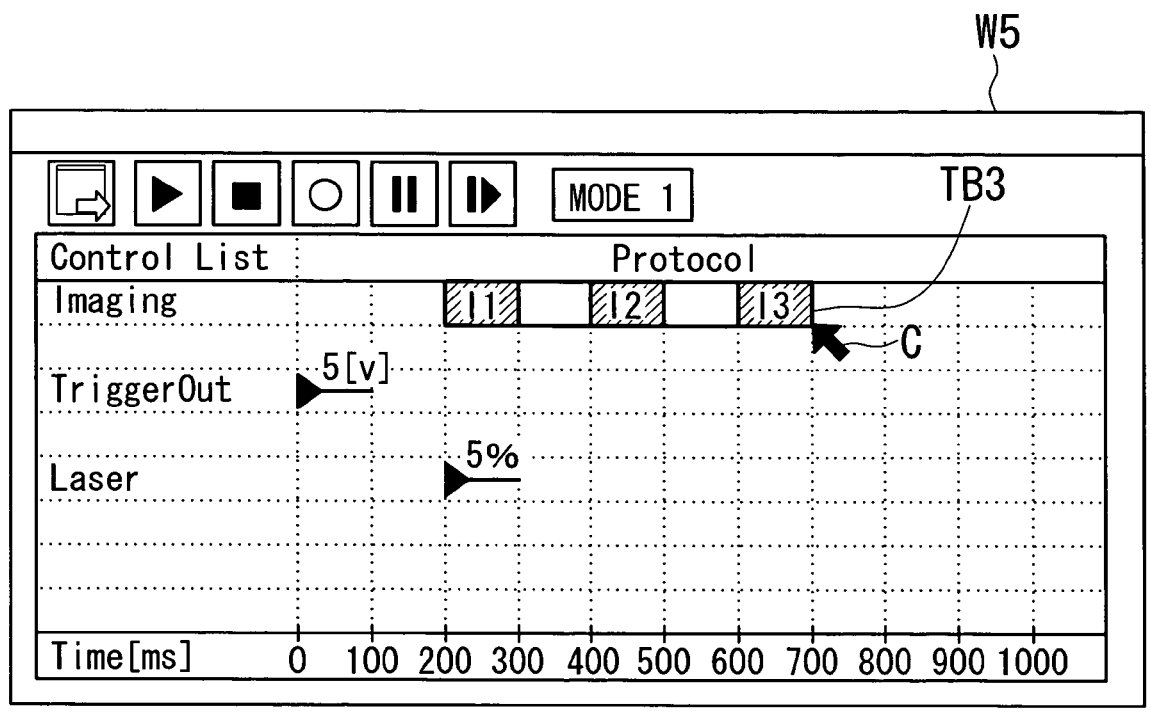
FIG. 9 illustrates the setting window shown in FIG. 8 with the control item set.

The images I1, I2, and I3 in the default state, as shown in FIG. 8, are moved by 200 ms so that the starting point is set at 200 ms, as show in FIG. 9. The control values set in the windows W1 to W5 are changed to those shown in FIG. 9. In other words, the default settings for the control items set in the setting dialogs D1 to D3 can be further changed via the GUI 200. The control times of the control items "Trigger Out" and "Laser" are set to 100 ms; these control values are unchanged once the control process is started and until subsequent control values are set.

Figure 11:
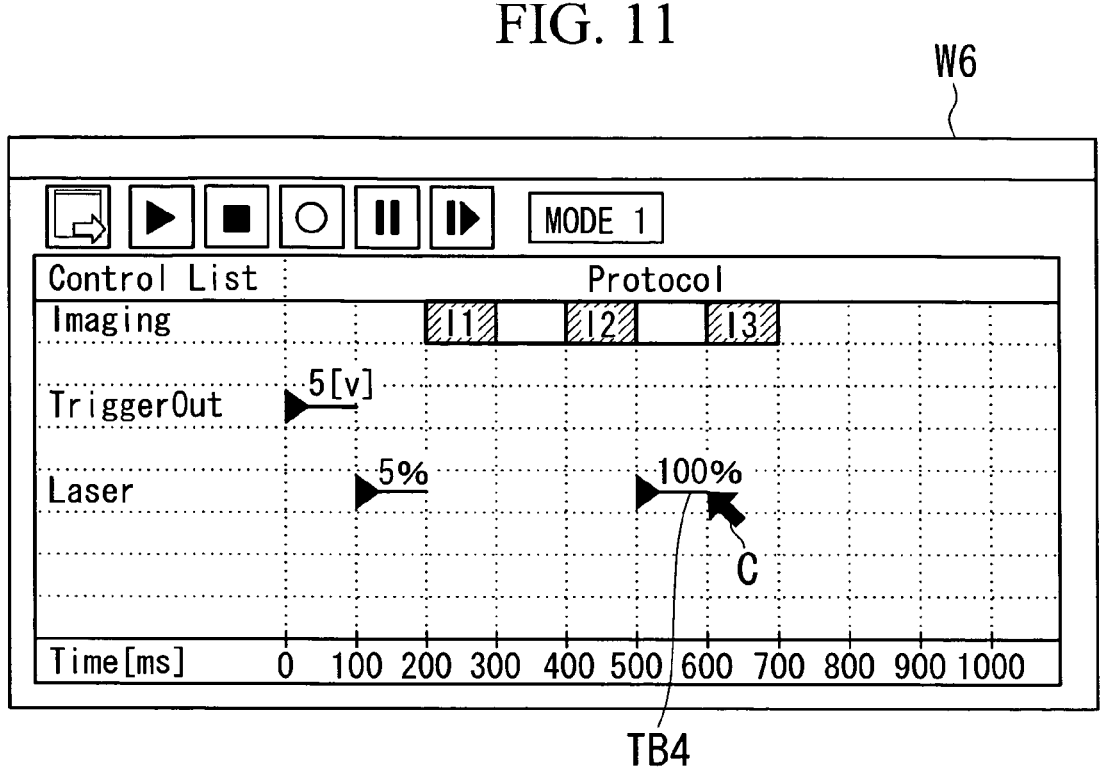
FIG. 11 illustrates the setting window shown in FIG. 10 with the control item set.

For example, as shown in FIGS. 10 and 11, a case in which the control values for the laser beam output power are to be changed or, more specifically, a case in which the control values corresponding to a process for acquiring image information of the images I1 to I3 at a 5% laser beam output power, as shown in the window W5 in FIG. 10, are changed to control values corresponding to a process for acquiring image information of only the image I3 with a 100% laser beam output power, as shown in a window W6 in FIG. 11, will be described below. First, by double-clicking the cursor C on the "Laser" area, the setting dialog D2 is displayed. Then, the characters "100" are input in the "Laser Power" setting box of the setting dialog D2 and the "OK" button is clicked. In this way, as shown in the window W6 in FIG. 10, an arrow-shaped task bar TB4 in the default state is displayed from 0 to 100 ms on the time line of the control item "Laser", and above the task bar TB4, the characters "100%" are displayed. Then, as shown in FIG. 11, the leading edge of the task bar TB4 is moved to 500 ms by dragging and dropping. In this way, the output of the laser beam is changed to 100% 500 ms after the control process is executed. The GUI 200 may be configured so that various settings may be directly changed only by operations carried out on the screen, such drag and drop.

Figure 12:
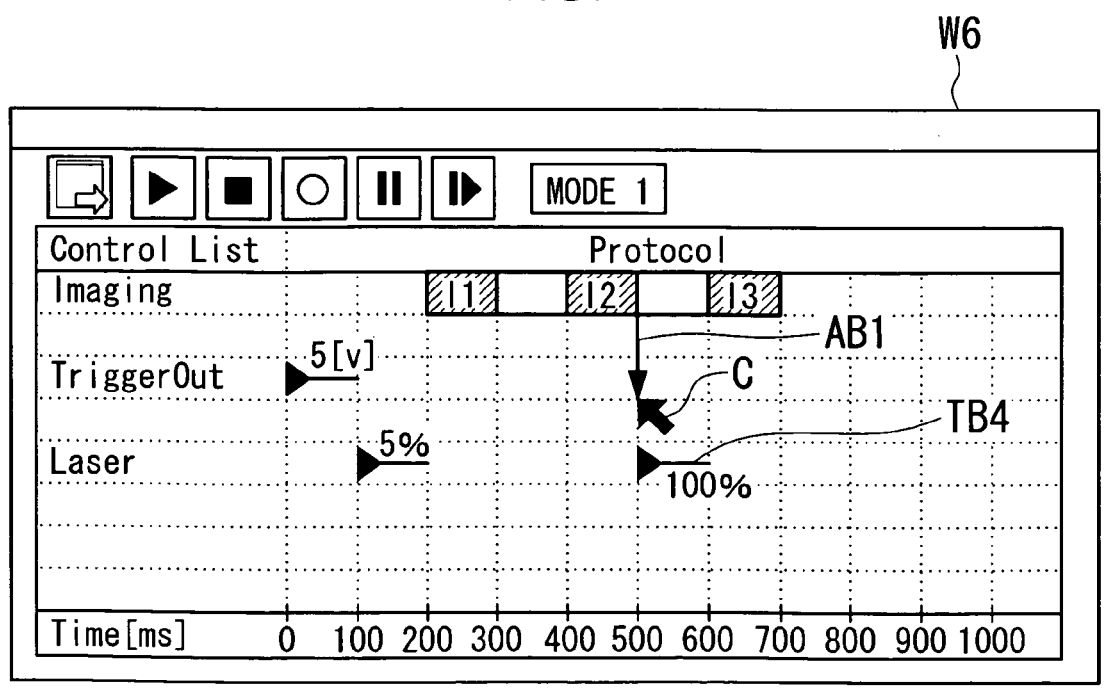
FIG. 12 illustrates a linking process in the setting window shown in FIG. 11.

Next, a process for linking control values will be described. The time resolution of a protocol (control settings) for the control values described above (i.e., the time resolution of each task bar disposed along the time line) is limited by the resolution of the processing time set in the processing unit configured to process the protocol (control settings). For example, if the time scale is set as shown in FIGS. 3 and 4, the time resolution of the protocol (control settings) is 100 ms. Thus, the starting points (i.e., left edges) of task bars representing different control values can only be provided in 100-ms units along the time line. Depending on the control value, it may be necessary to start the processing immediately after completing the previous processing. In such a case, by using a linking process, the completion time of the previous processing may be set as the starting time of the subsequent processing, wherein the timing is not limited by the time resolution of the protocol. For example, if the laser beam output power is to be changed while image information for the images I1 to I3 is being acquired, these two processes (i.e., image information acquisition and laser output power adjustment) may be linked using a linking symbol. As shown in FIG. 12, by clicking at the trailing edge of the image I2, a linking symbol AB1 is displayed. By dragging and dropping the linking symbol AB1, the linking symbol AB1 can be connected to the leading edge of the task bar TB4. The linking symbol AB1 sets the control processes so that the laser beam output is changed to 100% at the same time the acquisition of the image I2 is completed. Accordingly, control processes corresponding to a plurality of control items can be linked to each other. In this way, even if the acquisition process of the image I2 is not completed at 500 ms, the laser beam output can be prevented from being changed to 100% until the acquisition process is completed.

Here, the image information acquired on the basis of the images I1 to I3, which are control values of the control item "Imaging", can be displayed on the pictures P1 to P3, as shown in FIG. 2. By clicking on the images areas I1 to I3, images corresponding to the image information are displayed in the pictures P1 to P3. For example, by clicking on the image I1, image information corresponding to the image I1 is displayed in the picture P1.

Display or nondisplay of image information can be set in advance. This setting, as shown in FIG. 13, is carried out by first clicking the cursor C on the image area I1 of the task bar TB3 to display a menu M2. In the menu M2, "Image" and/or "Graph" can be selected. Here, if "Image" is selected by clicking the "Image" area, a setting dialog D20 is displayed. The setting dialog D20 includes a "Display On" button for displaying image information, a "Display Off" button for turning off the image information display, and an "OK" button for confirming the selection.

Here, if "Display" is selected and the "OK" button is clicked, images corresponding to the image information will be displayed. The image display setting can be carried out individually for each of the control values, that is, images I1, I2, or I3, or can be carried out collectively for all of the control values, that is, images I1 to I3. When "Display off" is selected, the processing load due to the image display process is reduced, and, therefore, the control process will not be affected, allowing the control values to be reliably processed.

Settings can be named and saved. For example, as shown in FIG. 14, by clicking the button B4 in window W6, a menu M3 is displayed. The menu M3 includes a "Save As" command for saving the control settings and an "Execute Control Process" command for executing the control settings. The user can select either one of the commands. Here, if the "Save As" command is clicked, a setting dialog D30 is displayed. The setting dialog D30 includes a name box for inputting a name and an "OK" button for confirming the name. If "Mode 1" is input in the name box and the "OK" button is clicked, the set control values will be saved under the name "Mode 1". By selecting "Mode 1", the control values saved as "Mode 1" will be displayed on the GUI and can be executed.

Figure 15:
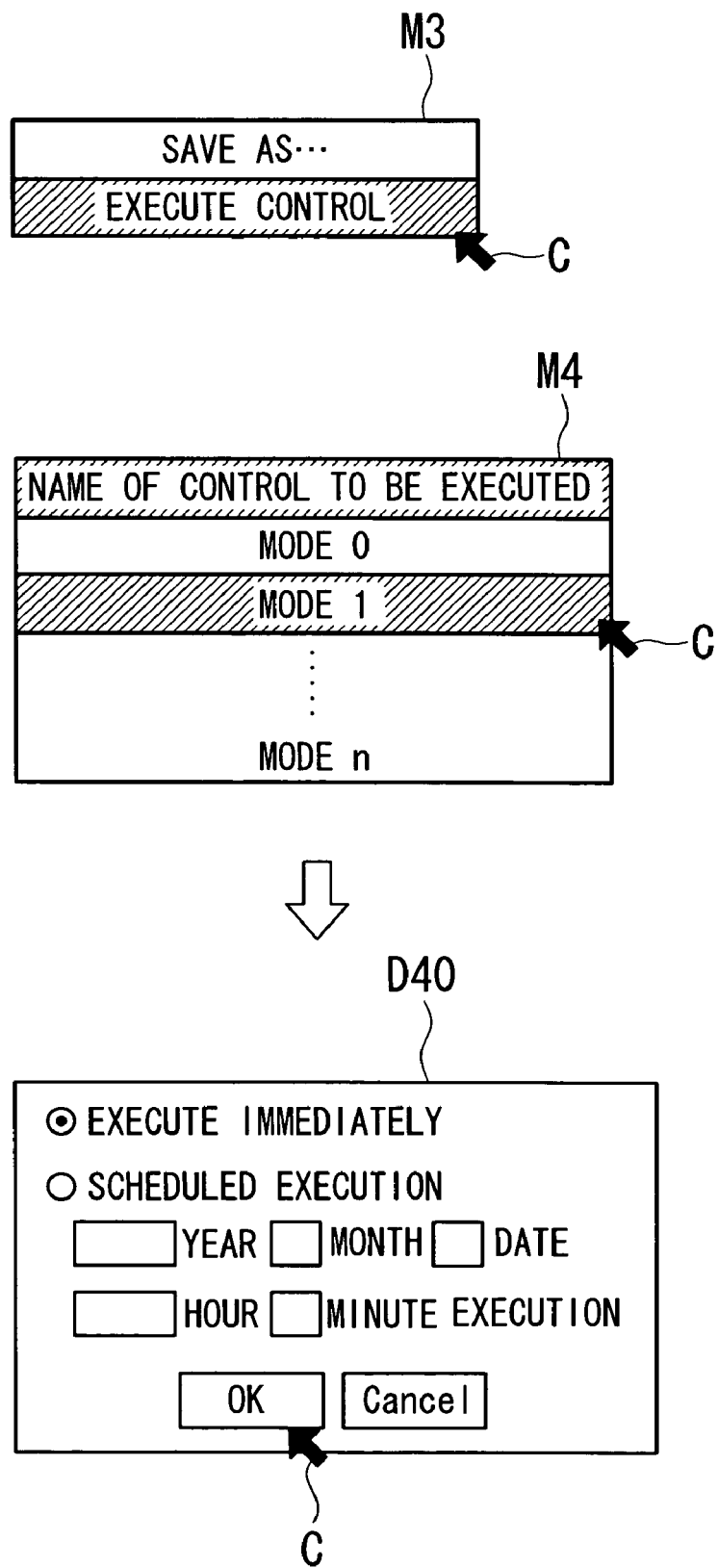
FIG. 15 illustrates a process for executing the settings named using the setting window in FIG. 14.

To execute the control values, the button B4 in the window W6 is clicked to display the menu M3, as shown in FIG. 14. Then, as shown in FIG. 15, by selecting the "Execute Control Process" command in the menu M3, a menu M4 is displayed. The menu M4 includes names of the control settings that have been saved in advance, including the last saved control settings. To execute the control values saved under the name "Mode 1", "Mode 1" is clicked to display a setting dialog D40. The setting dialog D40 includes an "Execute Immediately" button for immediately executing the control values corresponding to "Mode 1", a "Scheduled Execution" button for programming the execution time for "Mode 1", and an "OK" button for confirming the selection. For example, to immediately execute the control values corresponding to "Mode 1", the "Execute Immediately" button is selected, the "OK" button is clicked, and then button B2 is clicked. In this way, the execution process starts immediately.

Figure 16:
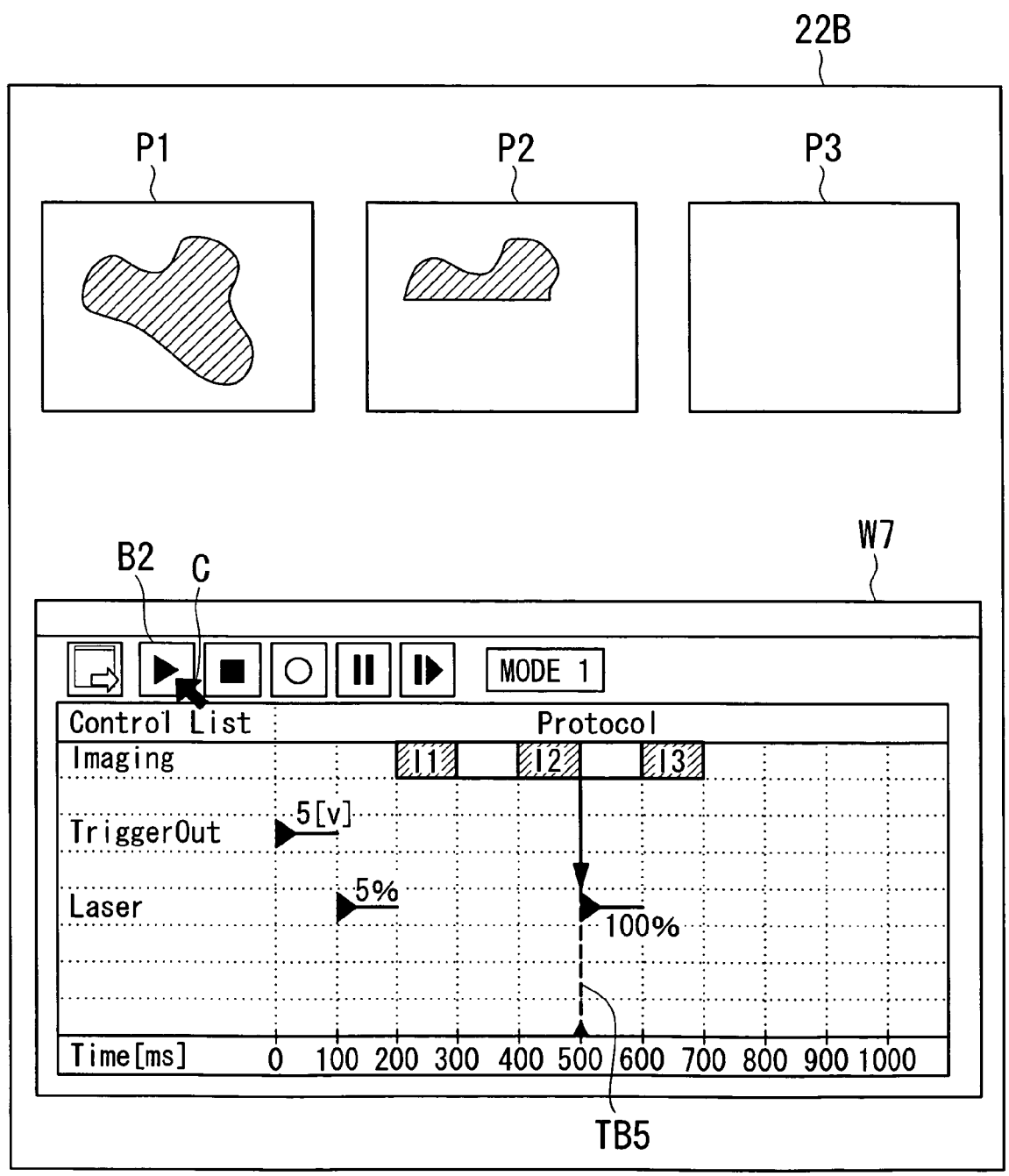
FIG. 16 illustrates a control execution screen while carrying out a control process.

Now, a screen displaying the execution state will be described. When the button B2 is clicked after the control values are set, the process proceeds to an execution state and an execution screen 22B is displayed, as shown in FIG. 16. While the control values are being executed, a task bar TB5 is displayed. The task bar TB5 moves as time elapses. The control currently being executed can be confirmed by the position of the task bar TB5. The control execution screen 22B shown in FIG. 16 represents a state corresponding to 500 ms after starting control execution. In this state, the processes for acquiring images I1 and I2 have already been completed and processes for displaying the images I1 and I2 are still being carried out. Therefore, for image I2, only partial image acquisition is displayed in the picture P2.

While the control values that have been set are executed, the control values that are actually being processed are stored in the recording medium (actual-control-value acquisition unit) 24 shown in FIG. 1. After all operations for control execution have been completed, the actual control values stored in the recording medium 24, corresponding to the task bars TB1 to TB4 and the linking symbol AB1, are displayed as task bars TB10 to TB40 and a linking symbol AB10, respectively. In this way, the set control values and the actual executed control values can be compared. The set control values and the actual control values may differ when the control processing capacity of the computer 2 is low or when there is an overload in control processing. When there is a difference between the control values, an adjustment process for changing the set control values to the actual control values is carried out.

Figure 17:
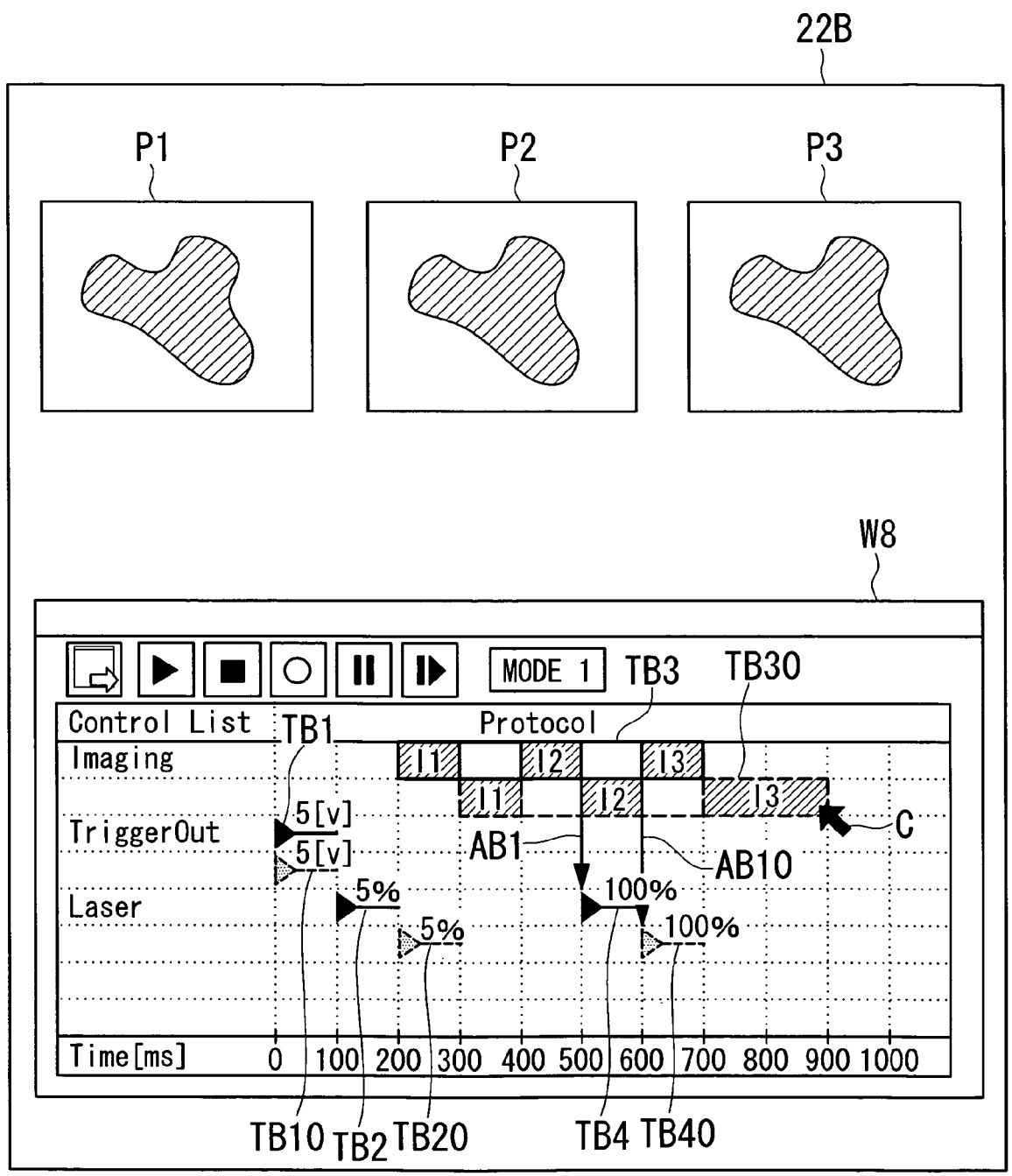
FIG. 17 illustrates a control execution screen displaying the actual control values after the control process has been executed.

First, by clicking the cursor C on the task bar TB30 representing actual control values, as shown in FIG. 17, a setting dialog (correction unit) D4 is displayed, as shown in FIG. 18. The setting dialog D4 includes an "Execute" button for executing the adjustment process, a "Do Not Execute" button for not executing the adjustment process, and an "OK" button for confirming the selection. Here, if the "Execute" button is selected and the "OK" button is clicked, a window W9 is displayed and the set control values are changed to the actual control values and are displayed on the time lines corresponding to the control values.

According to this embodiment, the control items are displayed along the vertical axis and the time line is displayed along the horizontal axis. In this way, the chronological relationship between the control values can be easily grasped. Accordingly, the control values can be set quickly and correctly while the control value processing for each control item relative to time can be easily grasped.

Next, the pausing of a control operation being executed will be described with reference to FIGS. 19 to 22.

Figure 19:
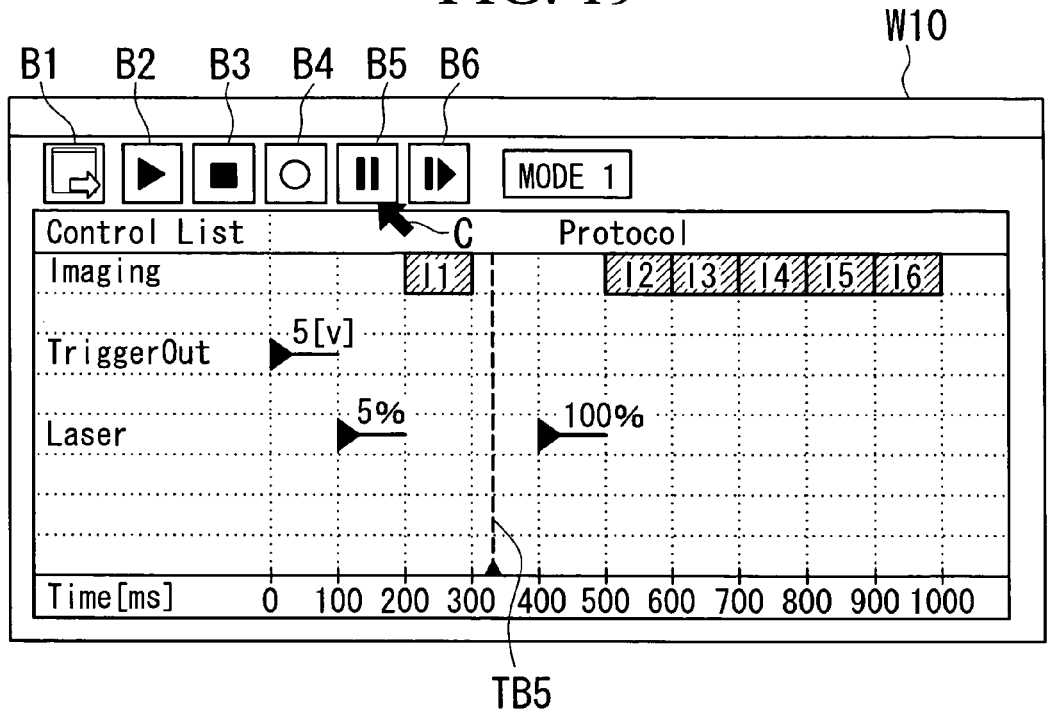
FIG. 19 illustrates an example setting window showing a pause process of a laser scanning microscope apparatus according to an embodiment of the present invention.

When a control operation needs to be paused for some reason, for example, depending on the condition of the specimen, when a control value is being executed, the user may click on the pause button B5 in a window W10, as shown in FIG. 19, to pause the execution. At this time, the task bar (stop position display) TB5 representing the execution state is stopped. The stopped task bar TB5 indicates at which point in time the execution state of the control was stopped.

Figure 20:
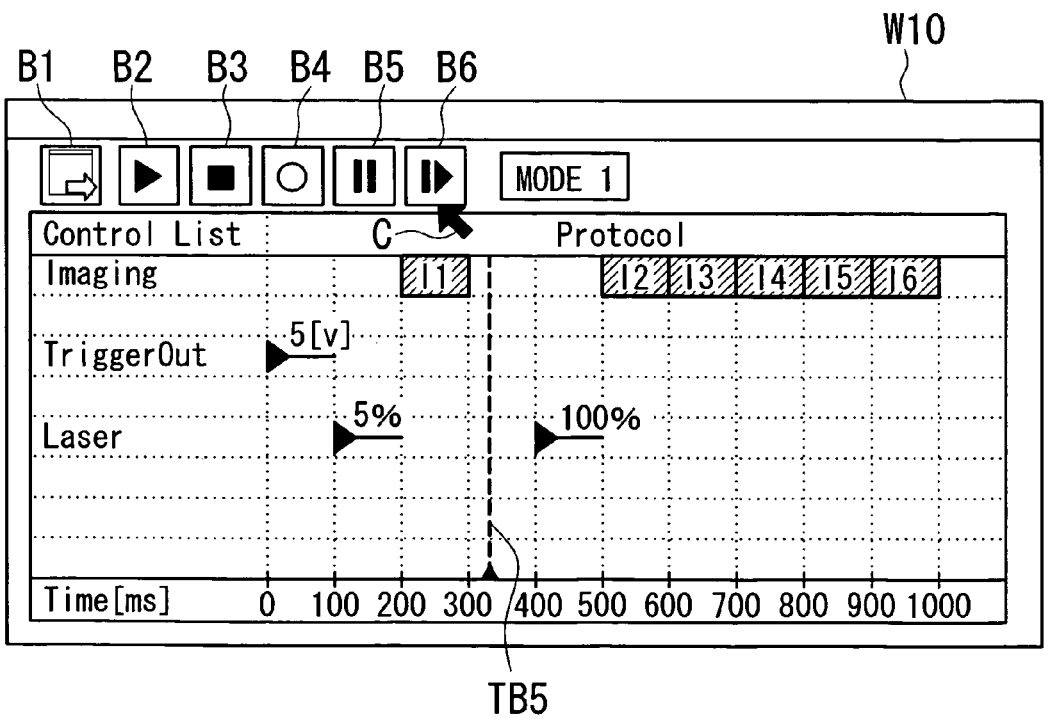
FIG. 20 illustrates an example setting window showing a process for resuming the control operation paused in FIG. 19.
Figure 21:
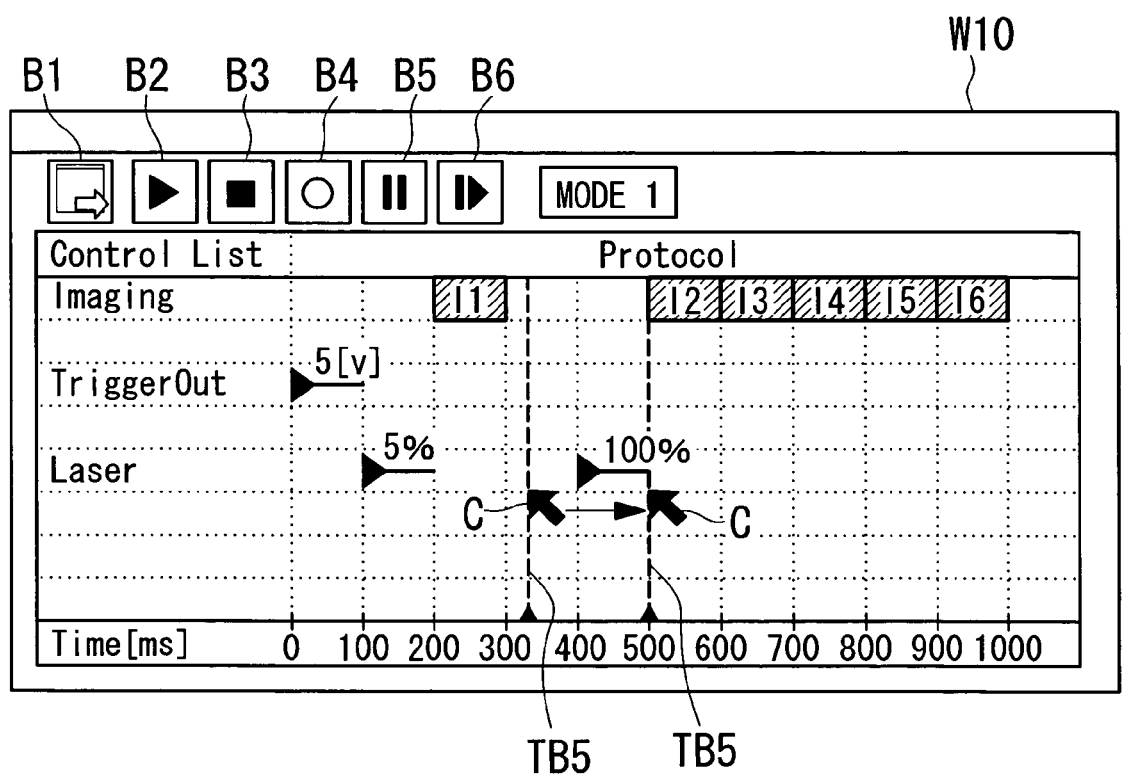
FIG. 21 illustrates an example setting window showing a process for setting the time for resuming the control operation paused in FIG. 19.

When the user clicks on the restart button B6, as shown in FIG. 20, so as to restart the control operation that was paused, the control operation is restarted from the stop position indicated by the task bar TB5. In such a case, according to this embodiment, the task bar (restart-time setting unit) TB5 can be selected by clicking the mouse and moved to a time where the control operation is to be restarted, as shown in FIG. 21. As a result, depending on the condition of the specimen, the restart position can be moved forward to skip a predetermined control value or the restart position can be moved backward to re-execute a control value that has already been executed.

Figure 22:
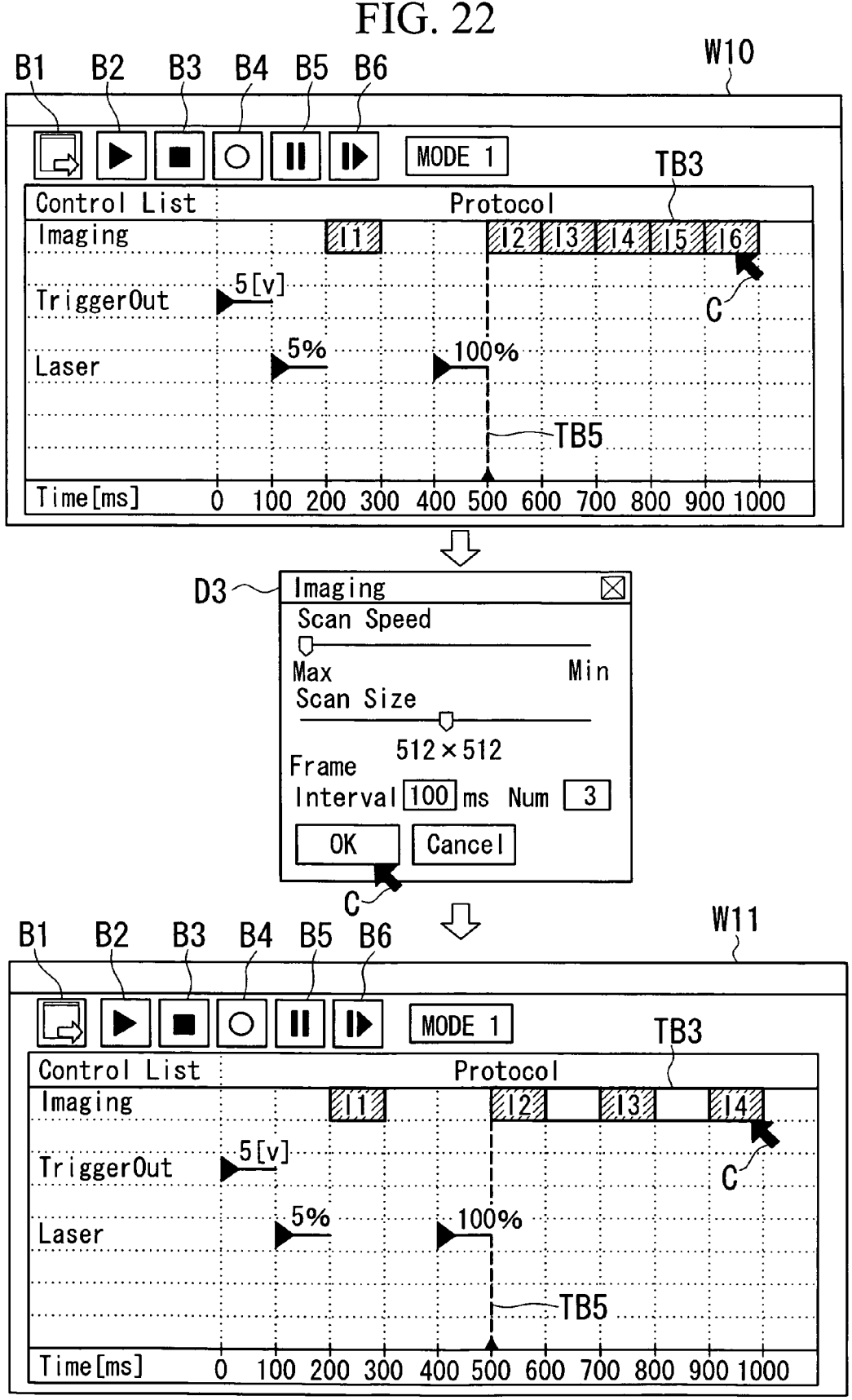
FIG. 22 illustrates an example setting window showing a process for editing control values of the control operation paused in FIG. 19.

According to this embodiment, control values can be edited while pausing. To edit a control value, the task bar (for example, task bar TB3) corresponding to the control value to be edited, among the control values that have already been set, is double-clicked, as shown in FIG. 22. Accordingly, the setting dialog (editing unit) D3 corresponding to the control item represented by the double-clicked task bar TB3 is displayed, allowing the control value settings to be changed in the setting dialog D3. In this way, a setting window W11 including the edited control value is displayed, and image information from the specimen can be acquired under conditions suitable for the specimen.

Figure 23:
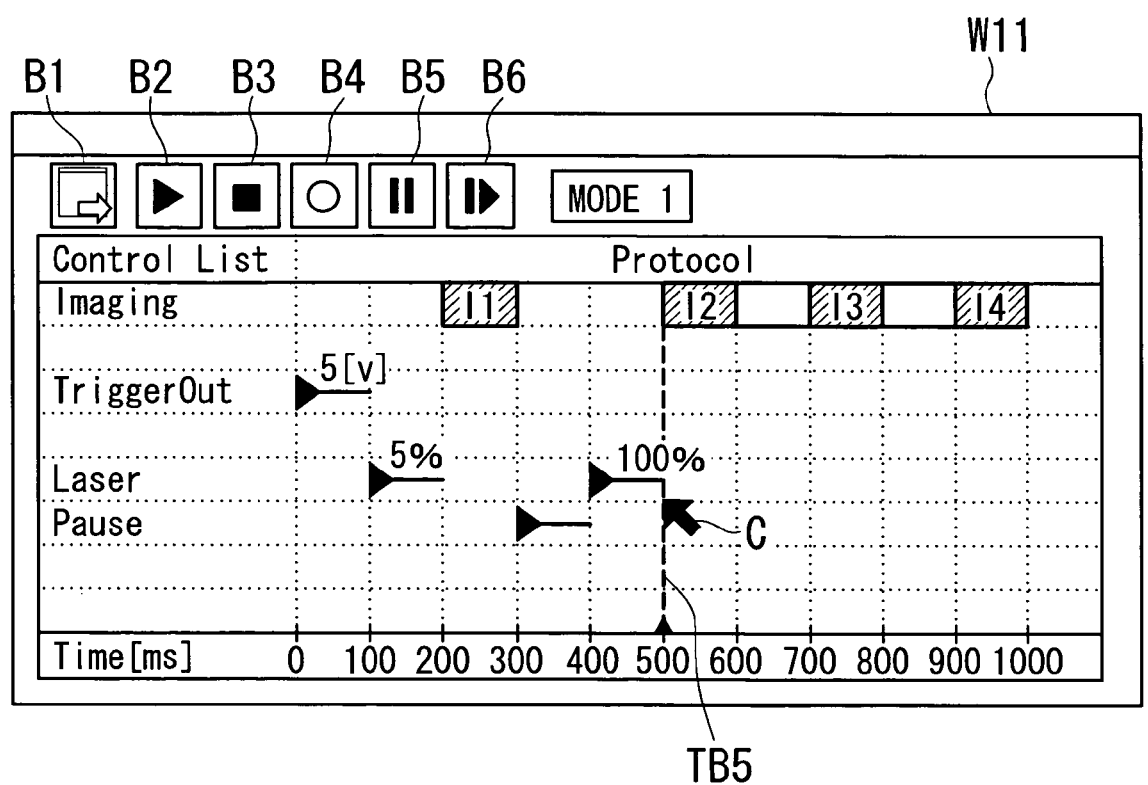
FIG. 23 illustrates an example setting window showing a modification of the pause process shown in FIG. 19, wherein a control item "Pause" is included in the setting window.

According to the above-described embodiment, the control operation is paused by operating the pause button B5. However, instead, "Pause" may be added as a control item, as shown in FIG. 23. In this way, the pause position can be set prior to execution of the control operation. Accordingly, the control operation can be paused at a predetermined time even when the status is not constantly monitored during execution.

Next, a case in which a control item whose processing time cannot be calculated in advance (hereinafter referred to as a "special control item") will be described.

A case in which the control items include "Imaging" for acquiring an image, "Bleaching" for bleaching the specimen, and "Analysis" for analyzing an image obtained by "Imaging" and "Bleaching" with the computer 2 is described with reference to FIGS. 24 to 31. Since the processing time required for "Analysis" changes depending on the operational state of the computer 2, an accurate amount of time cannot be determined when setting the control value using the GUI 200. Hence, "Analysis" is a special control item.

Figure 24:
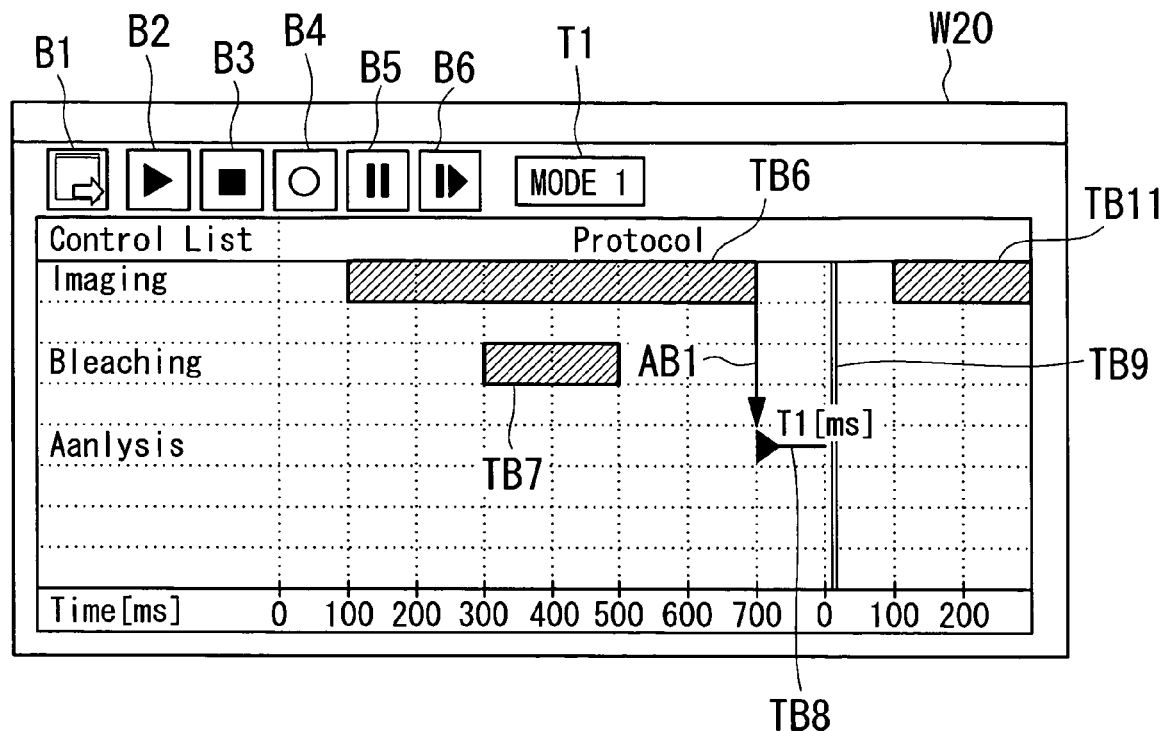
FIG. 24 illustrates an example setting window according to a laser scanning microscope apparatus according to an embodiment of the present invention, wherein the setting window shows the setting process carried out when a special control item is included in the control items.

According to this embodiment, as shown in FIG. 24, to set the control value of "Analysis", the processing time is tentatively defined as "T1". Then, after the "Analysis" process is completed, the elapsed time is recalculated and is substituted for "T1". To set control values after the "Analysis" process is completed, a time line having a starting point corresponding to the ending time of the "Analysis" process is displayed and the control items are set along this time line. The final history is recorded with respect to the continuous time line from the start of the experiment, including the recalculated elapsed time required for the "Analysis" process.

As shown in the example in FIG. 24, 100 ms after starting the experiment, image acquisition is carried out for 600 ms. Then, 300 ms after starting the experiment, a laser beam for stimulating the specimen is emitted from the laser scanning microscope 1 for 200 ms. Image acquisition is carried out continuously without intervals, and image acquisition and specimen stimulation are controlled without synchronizing them with each other. After completing image acquisition (i.e., 700 ms after starting the process), the "Analysis" process is carried out on the acquired image by the computer 2 so as to obtain a fluorescence recovery curve as an analytical result. Image acquisition is started again 100 ms after completing the "Analysis" process. The conditions for image acquisition are: image size, 512×512; scanning speed, maximum speed; bleaching speed, maximum speed; bleaching area, (100,100)-(200,200); and bleaching laser intensity, 50%.

Figure 25:
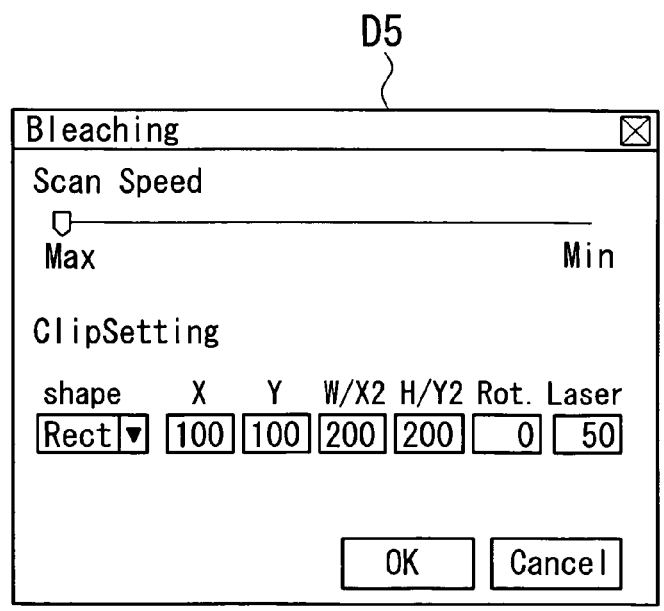
FIG. 25 illustrates an example setting dialog displayed when the control item "Bleaching" is selected in FIG. 24.
Figure 26:
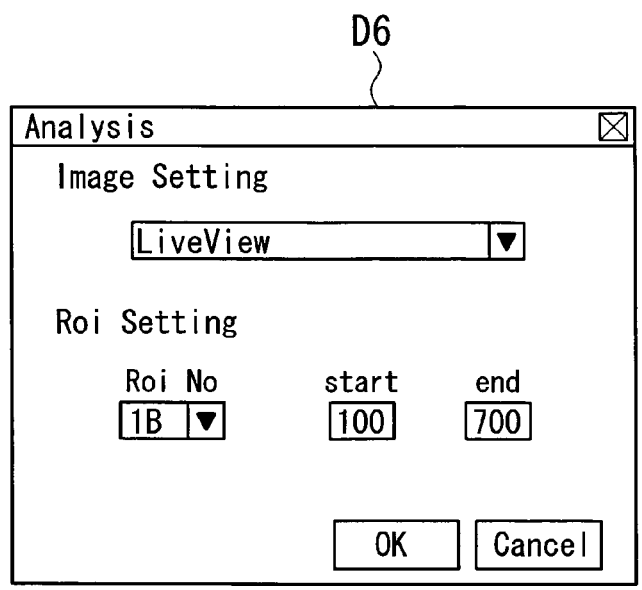
FIG. 26 illustrates an example setting dialog displayed when the control item "Analysis" is selected in FIG. 24.
Figure 27:
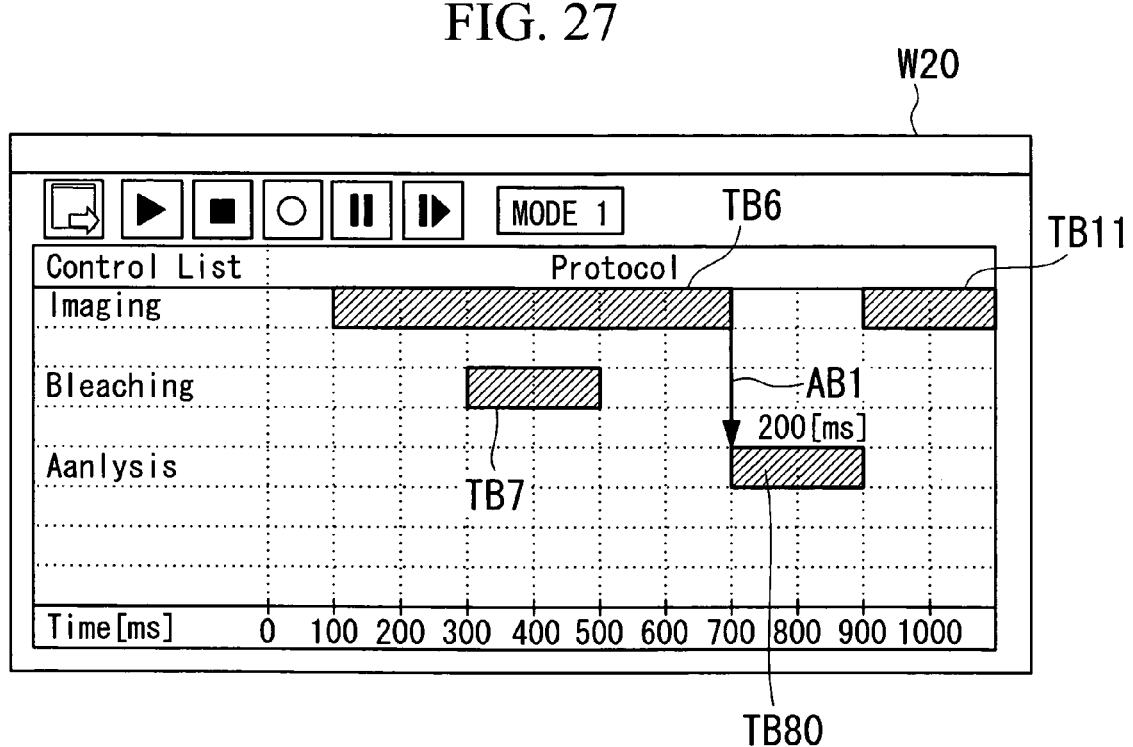
FIG. 27 illustrates an example result of a calculation performed after the process set in FIG. 24 is completed.

For each control item, a task bar is displayed and the position and length of the task bar is set by mouse actions, such as clicking, dragging and dropping. Moreover, to set the control value, the task bar is double-clicked to display a dialog box, as shown in FIG. 25 or 26. Since the content of the dialog box differs according to the control item of the double-clicked task bar, control values can be set in detail by adjusting the displayed content.

The processing time corresponding to the length of a task bar represents the amount of time required for processing the control value. However, as described above, since the processing time of the special control item "Analysis" cannot be calculated in advance, processes subsequent to the "Analysis" process are stored in the recording medium 24 relative to the completion time of "Analysis".

More specifically, first, image acquisition conditions are set in a window W20, as shown in FIG. 24. To do so, the mouse is right-clicked on the control item "Imaging" so as to display a task bar TB6. Then, the task bar TB6 is dragged and moved to the 100-ms position on the time line. By double-clicking the task bar TB6, the dialog box D3, shown in FIG. 8, is displayed, and the scanning speed is set to "Max", the image size is set to "512×512", the number of frames to be acquired is set to "6", and the interval is set to "0 ms". The number of acquired frames may be changed by extending or shortening the task bar TB6 with the mouse.

Next, bleaching conditions are set. To do so, in the window W20 shown in FIG. 24, the mouse is right-clicked on the control item "Bleaching" to display a task bar TB7. Then, the task bar TB7 is dragged with the mouse and moved to the 300-ms position on the time line. By double-clicking the task bar TB7, a dialog box D5, shown in FIG. 25, is displayed, and the scanning speed is set to "Max", the shape of the target area (Roi) to be stimulated is set to "Rect", the area size is set to "(100,100)-(200,200)", and the stimulating laser intensity is set to 50%. To change the stimulation time, the task bar TB7 may be extended or contracted with the mouse.

Next, analysis conditions are set. To do so, the mouse is right-clicked on the control item "Analysis" to display a task bar TB8. Then, the task bar TB8 is dragged with the mouse and moved to the 700-ms position on the time line. By double-clicking the task bar TB8, a dialog box D6, shown in FIG. 26, is displayed to select the image data to be processed and the section to be analyzed. "Start" and "End" shown in the drawing are parameters for setting the section to be analyzed. In this case, the luminance distribution of an image obtained during the period from 100 ms to 700 ms after starting the protocol is analyzed. In the section to be analyzed, the "Imaging" start time and the "Imaging" end time of the task bar TB8 may be automatically set by the linking symbol AB1, which links the task bar TB6 with the task bar TB8, as shown in the drawing.

Since the processing time for the "Analysis" process cannot be estimated in advance, only the processing start time is assigned. In such a case, since the processing elapsed time is recalculated at the end of the "Analysis" process, a processing time recalculation line TB9 is drawn in the window W20, as shown in FIG. 24, and the subsequent time notation is changed to a time notation relative to the end of the "Analysis" process.

Finally, an image capture process is set after the "Analysis" process in the same manner as described above (for example, a task bar TB11). In this way, the experimental procedure shown in FIG. 24 is generated by relating control items to the time line.

The experimental procedure generated in such a manner is notified by the GUI 200 to the processing unit 201, as shown in FIG. 1. Notification may be carried out when the button B1, shown in FIG. 24, is pushed. According to this process, the processing unit 201 generates a table determining when and what type of control commands should be sent to the laser scanning microscope control unit 1. Hereinafter, this table is referred to as a "task table".

Subsequently, an experiment start command is output from the GUI 200 to the processing unit 201. This output may be carried out when the user pushes the button B2, shown in FIG. 24. According to this process, the processing unit 201 notifies the control values contained in the task table to the microscope-apparatus control unit 202 at each time interval specified in the task table.

At the microscope-apparatus control unit 202, it is determined whether a control item is a special control item. If the control item is not a special control item, processing is carried out in accordance with the timing set by the GUI 200. If the control item is a special control item, processing of a subsequent control value is carried out after processing of a control value corresponding to the special control item is completed. According to this embodiment, each processing is carried out in accordance with the task table, and when the processing of the control value corresponding to the special control item "Analysis" is completed, the processing is controlled so that the subsequent processing is carried out. When the processing of a control value corresponding to "Analysis" is completed, the processing elapsed time is recalculated and the processing time is displayed as a task bar TB80, shown in FIG. 27. The subsequent processing time is displayed in absolute time.

In this way, the processing is carried out in accordance with the experimental procedure shown in FIG. 24 without generating any dead time between the "Analysis" process, whose processing time cannot be estimated in advance, and the subsequent processes. Since, after completing the "Analysis" process, the time required by the "Analysis" process is recalculated and displayed, an accurate control history can be obtained after the experiment.

Figure 28:
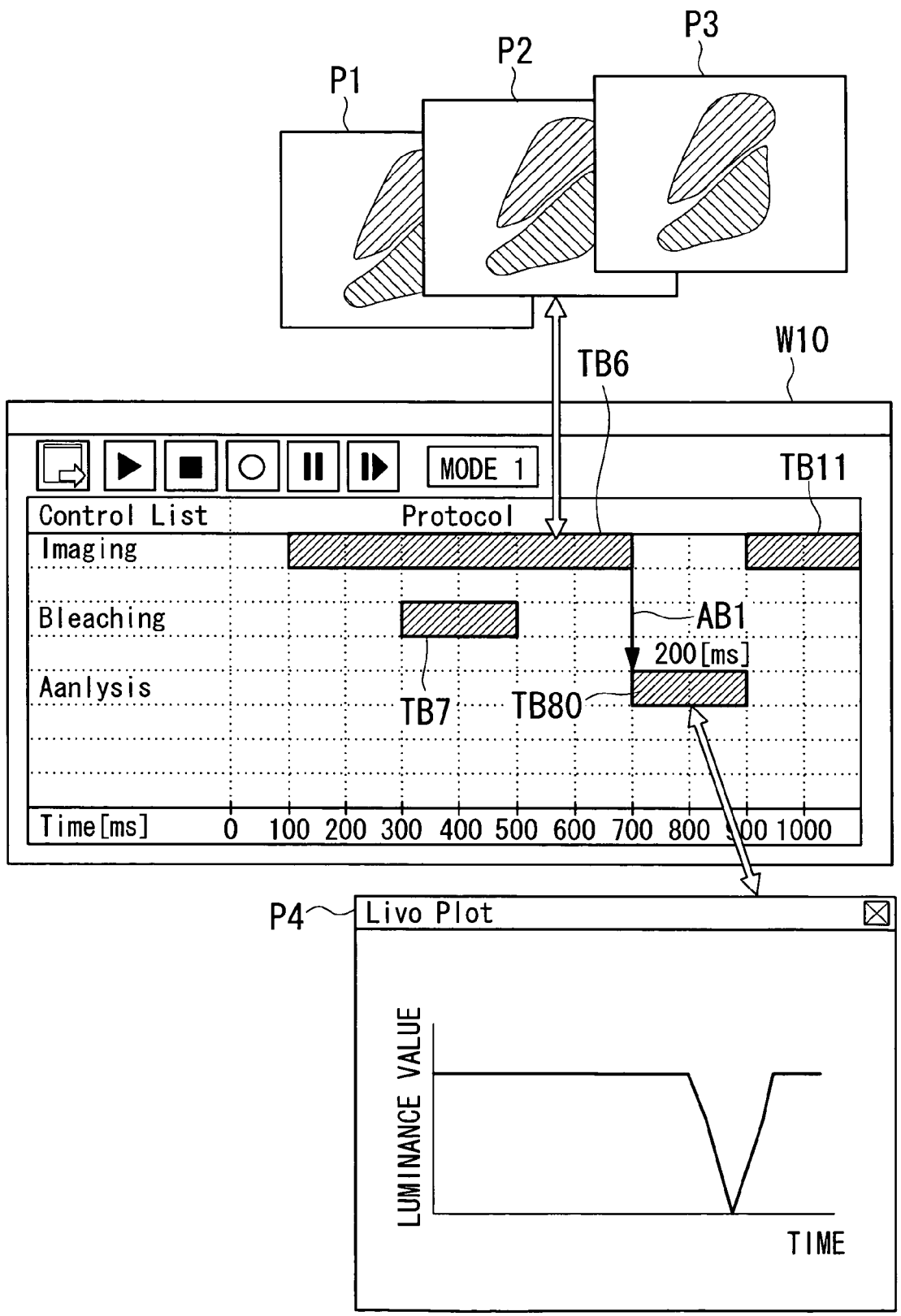
FIG. 28 illustrates a case in which processing results and acquired images are displayed in relation to task bars.

According to this embodiment, the image data and the results of the "Analysis" process obtained through the above-described procedure can be linked to task bars so that the results are displayed in the pictures P1 to P4 when the task bars are assigned using the mouse, as shown in FIG. 28. The linking method may be a method for linking and storing the file path where the result is stored to a task bar, or a method for linking and storing a memory address, if the result is loaded into a memory.

Here, an observation method using the fluorescent protein Dronpa is described as an example of an application using the laser scanning microscope according to this embodiment.

Dronpa is a green fluorescent protein. When Dronpa is irradiated with intense blue-green light (for example, a 488-nm laser beam), it becomes nonfluorescent. Then, the fluorescence recovers by irradiating a purple beam or an ultraviolet beam (for example a 405-nm laser beam). This process is completely reversible and can be repeated. The on and off state of the fluorescence can be used to repeatedly carry out fluorescence recovery after photobleaching (FRAP).

However, although the fluorescence may be recovered repeatedly, the fluorescence intensity is degraded after several hundred laser irradiations. As a result, the fluorescence generated after several hundred laser irradiations cannot be sufficiently detected under the same conditions as those at the start of observation. Therefore, after an image is acquired by laser irradiation, the luminance distribution in a predetermined area of the acquired images is analyzed. Then, by calibrating the fluorescence detection sensitivity in accordance with the analysis result, the luminance distribution of the acquired image can be maintained constant even when observation is carried out after repeated laser irradiations.

Figure 29:
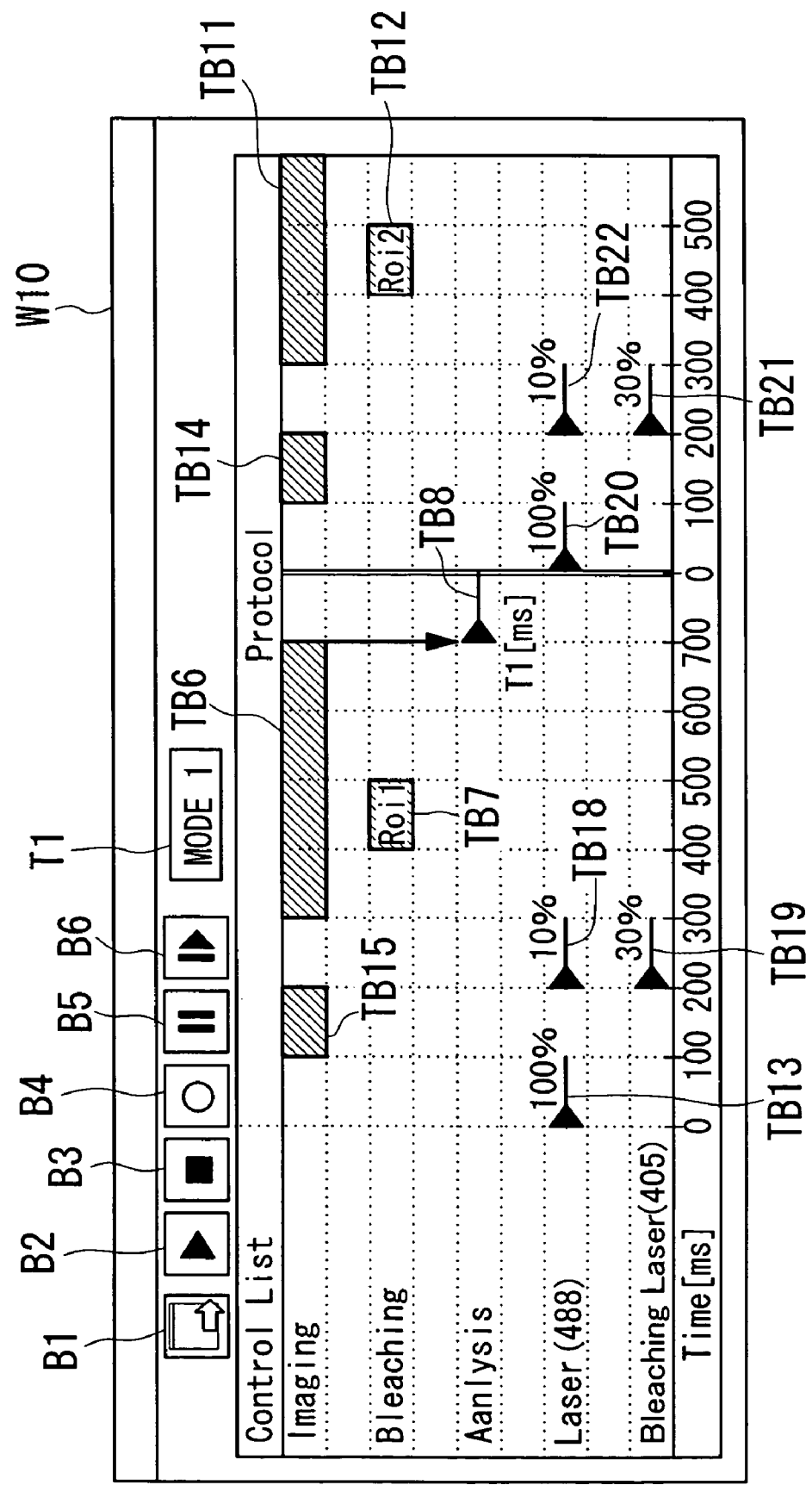
FIG. 29 illustrates an example application of the laser scanning microscope apparatus according to an embodiment of the present invention.

Task bars are arranged as shown in FIG. 29 to generate such an experimental procedure.

First, "Imaging", "Bleaching", "Analysis", "Laser (488)", and "Bleaching Laser (405)" are set as control items. "Imaging" is used to carry out regular fluorescence observation. In addition, by carrying out this control item with an intense laser beam, the fluorescent protein Dronpa is made nonfluorescent. In this example experiment, "Bleaching" is used to recover fluorescence by recovering the absorption wavelength characteristics of the fluorescent protein Dronpa, which differs from the usual purpose of fluorescent bleaching. "Laser (488)" is a control item for setting the laser to be used when executing "Imaging". "Bleaching Laser (405)" is an item for setting the laser to be used when executing "Bleaching". The numbers in parentheses represent the wavelength of the laser beam to be used. In other words, in "Imaging", a laser beam having a wavelength of 488 nm is used, and in "Bleaching", a laser beam having a wavelength of 405 nm is used.

Figure 30:
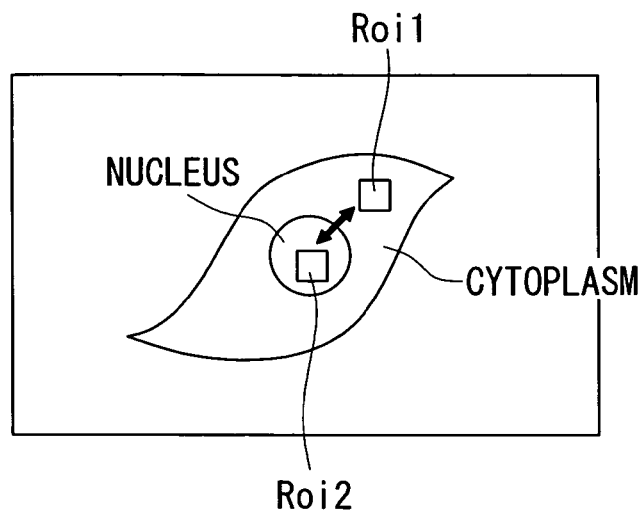
FIG. 30 is a schematic view of an example specimen to be observed by emitting a laser beam according to the application shown in FIG. 29.

The characters "Roi1" and "Roi2" displayed on the task bars TB7 and TB12, respectively, indicate the areas where "Bleaching" is executed. More specifically, "Roi1" and "Roi2" correspond to the areas Roi1 and Roi2 shown in FIG. 30. FIG. 30 illustrates the microscope field including one cell. Roi1 is set in an area in the cytoplasm, and Roi2 is set in an area in the nucleus.

The task bars are set as shown in FIG. 29. By setting the task bars in this way, the above-described experimental procedure can be carried out. This is described in order below.

At the task bar TB15, the specimen is irradiated with a strong 488-nm laser beam having a 100% intensity set at a task bar TB13. As a result, the fluorescent protein Dronpa becomes nonfluorescent in the entire microscope field (i.e., the entire cell). Then, at the task bar TB6, the specimen is irradiated with a weak 488-nm laser beam having a 10% intensity set by a task bar TB18 and fluorescence observation is carried out. In this way, the movement of the fluorescent protein Dronpa from the Roi1 area (cytoplasm) of the specimen can be observed. This observation is possible since the Roi1 area of the specimen is irradiated with a 405-nm laser beam having a 30% intensity after starting the image observation by the task bar TB7 after image observation by the task bar TB6 is started and the fluorescence of only the Dronpa in the Roi1 area is recovered. Next, at the task bar TB8, the luminance of the image acquired by the task bar TB6 is analyzed.

Next, at a task bar TB14, the specimen is irradiated with a strong 488-nm laser beam having a 100% intensity set at a task bar TB20, and the entire specimen becomes nonfluorescent. Then, at a task bar TB11, fluoroscopy is carried out in a manner similar to that at the task bar TB6, and the movement of the fluorescent protein Dronpa from the Roi2 area (nucleus) of the specimen is observed. This observation is possible since the Roi2 area of the specimen is irradiated with a 405-nm laser beam having a 30% intensity by the task bar TB12, and the fluorescence of only the Dronpa in the Roi2 area is recovered.

As described above, if the fluorescence intensity is degraded (i.e., if discoloration occurs) during the processes of repeating the experimental procedure, the degradation of fluorescence intensity can be corrected in the following manner. When the analytical results of the task bar TB8 carried out in the repeated process are compared and the luminance of the current analytical result is lower than the luminance of the previous analytical result, the sensitivity of the detection unit is increased in the next experiment to correct the intensity for the next experiment. In this way, for an application that repeats the same process, the luminance distribution of the acquired images can be maintained constant.

The control items corresponding to a special control item are controlled so that the processing of the subsequent control value is started in synchronization with the end of the processing of the previous control value. However, if the processing result of the control value of such a special control item is not used for the processing of the subsequent control value, the processing of the subsequent control value may be started without being in synchronization.

Figure 31:
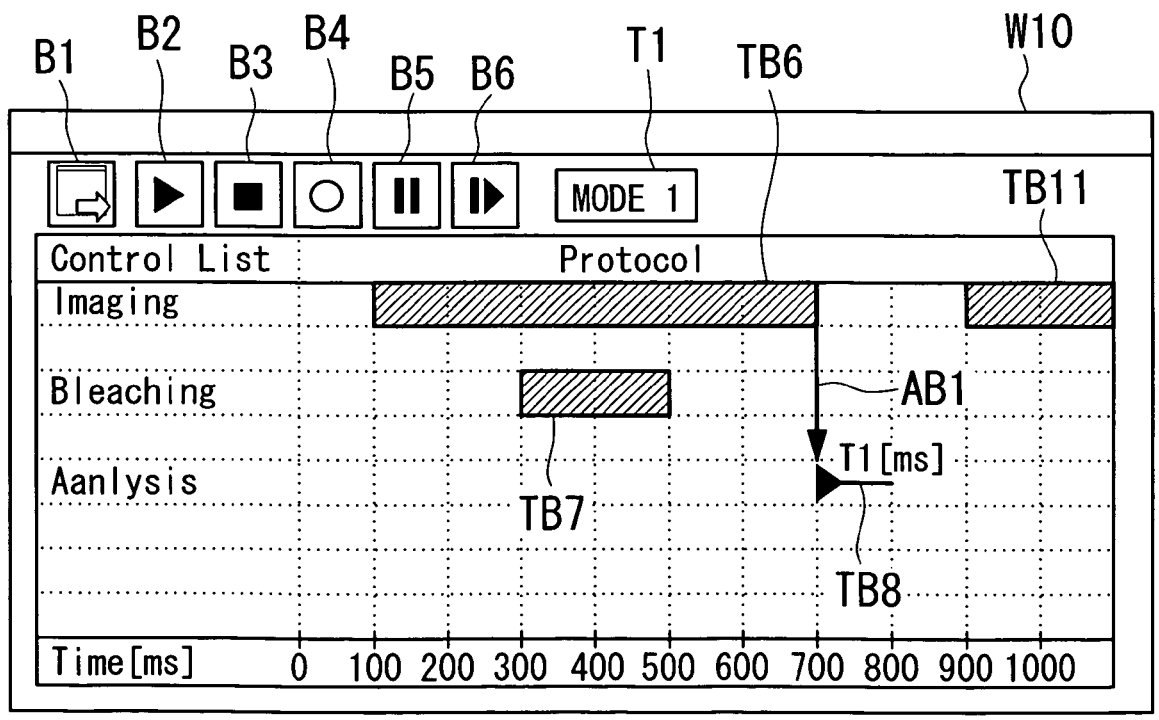
FIG. 31 illustrates an example of a setting window of a laser scanning microscope according to a modification of an embodiment of the present invention processing of a subsequent control value is started without being in synchronization with the completion of when the processing of a control value corresponding to a special control value.

In such a case, as shown in FIG. 31, a control value corresponding to a special control item is tentatively displayed as "T1", in as similar manner as FIG. 24. However, absolute time is used from the start of the processing for the time line corresponding to the subsequent control values. Hence, the control values are processed in accordance with a continuous time line, and the control values are processed in time regardless of the processing state of the control value corresponding to the special control item. For the control value corresponding to the special control item, after the processing is completed, recalculation is carried out and the obtained processing time is recorded in the control history.

The "Analysis" process was described as an example of a special control item. However, any other control item corresponding to a process carried out by the computer 2, such as image filtering or computation of images, may be employed.

As described above, the control items are displayed along the vertical axis and the time line is displayed along the horizontal axis. In this way, the chronological relationship between the control values can be easily grasped. Accordingly, the control values can be set quickly and correctly while the control-value processing for each control item relative to time can be easily grasped.

According to this embodiment, the control items are displayed along the vertical axis and the time line is displayed along the horizontal axis. However, the control items and the time line may be displayed along the horizontal axis and the vertical axis, respectively. The pictures P1 to P3 (for example, refer to FIG. 2) are not limited to three pictures. The characters and numbers included in the control items, the shape of the task bars, and the linking symbols, and the setting methods are not limited to those shown in the drawings. For example, as a method for setting a task bar for a control item, the task bar may be displayed at a predetermined time position along the row of the control list of the control item to be set by clicking the position with the mouse 25A (refer to FIG. 1). The length of a task bar is determined on the basis of the required processing time read out from a required processing time data table for each control item stored in the computer 2 (refer to FIG. 1). However, instead, if the task bar is an image acquisition task bar that can be extended or contracted, the length of the task bar may be extended by dragging the mouse 25A rightwards and the end point of the task bar becomes the position where the mouse 25A is released. It is preferable if the dialogs D1 and D2, shown in FIGS. 5 and 6, automatically expand when the mouse 25A is released since this reduces the number of mouse operations.

First Modification

Next, a first modification of the embodiment according to the present invention will be described. According to the above-described embodiment, images corresponding to the acquired image information are displayed in the pictures P1 to P3, whereas, according to this first modification, graphs corresponding to the acquired image information are displayed in the pictures P1 to P3.

FIG. 32 illustrates the window W6 after the control settings are completed. By double-clicking the cursor C in the image I1 area of the task bar TB3 in the window W6, the menu M2 is displayed. In the menu M2, "Image" and/or "Graph" can be selected. Here, if "Graph" is clicked, a graph representing the change of the luminance of the image I1 over time is displayed in picture P1. The graph may represent the image information in any way and is not limited to representing the change of luminance over time.

Second Modification

Next, a second modification of the embodiment according to the present invention will be described. According to the second modification of the embodiment according to the present invention, a setting can be repeated by using a control value that has already been set.

Figure 33:
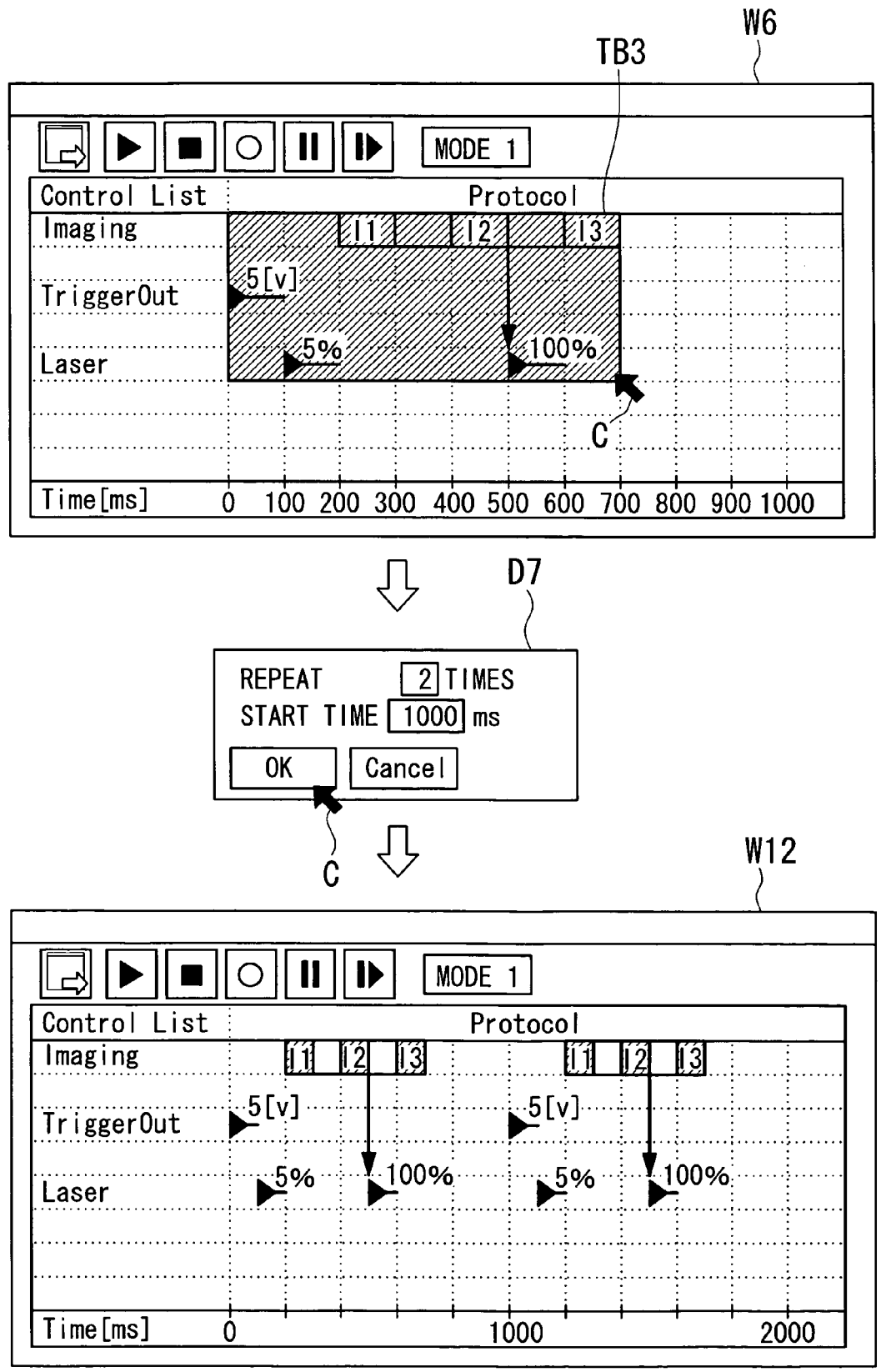
FIG. 33 illustrates repetition setting of control values according to a second modification of an embodiment of the present invention.

As shown in FIG. 33, for example, to repeat the settings of the control values from 0 ms to 700 ms two times, the hatched area is assigned by dragging the cursor C. When the cursor C is right-clicked in the hatched area, a setting dialog D7 is displayed. The setting dialog D7 has a setting box for setting the number of times to repeat the setting, a setting box for setting the starting time of the repeating process, and an "OK" button for confirming the setting. Here, if "2" is input in the setting box for setting the number of repetitions, "1000" is input in the setting box for setting the starting time, and then the "OK" button is clicked, a window W12 is displayed. In the window W12, the full scale of the time line is changed from "0 to 1000" to "0 to 2000", and acquisition of the images I1 to I3 is set to be repeated twice. The task bars in the repeated processing area do not have to be copied exactly in accordance with the actual processed values, as shown in the lower section of FIG. 33; a hatched area representing the repeated processing area may simply be displayed, as shown in the upper section of FIG. 33. The repeated execution area may be displayed by two vertical bars indicating the start and the end of the repeated processing area instead of displaying it by a hatched area.

Figure 34:
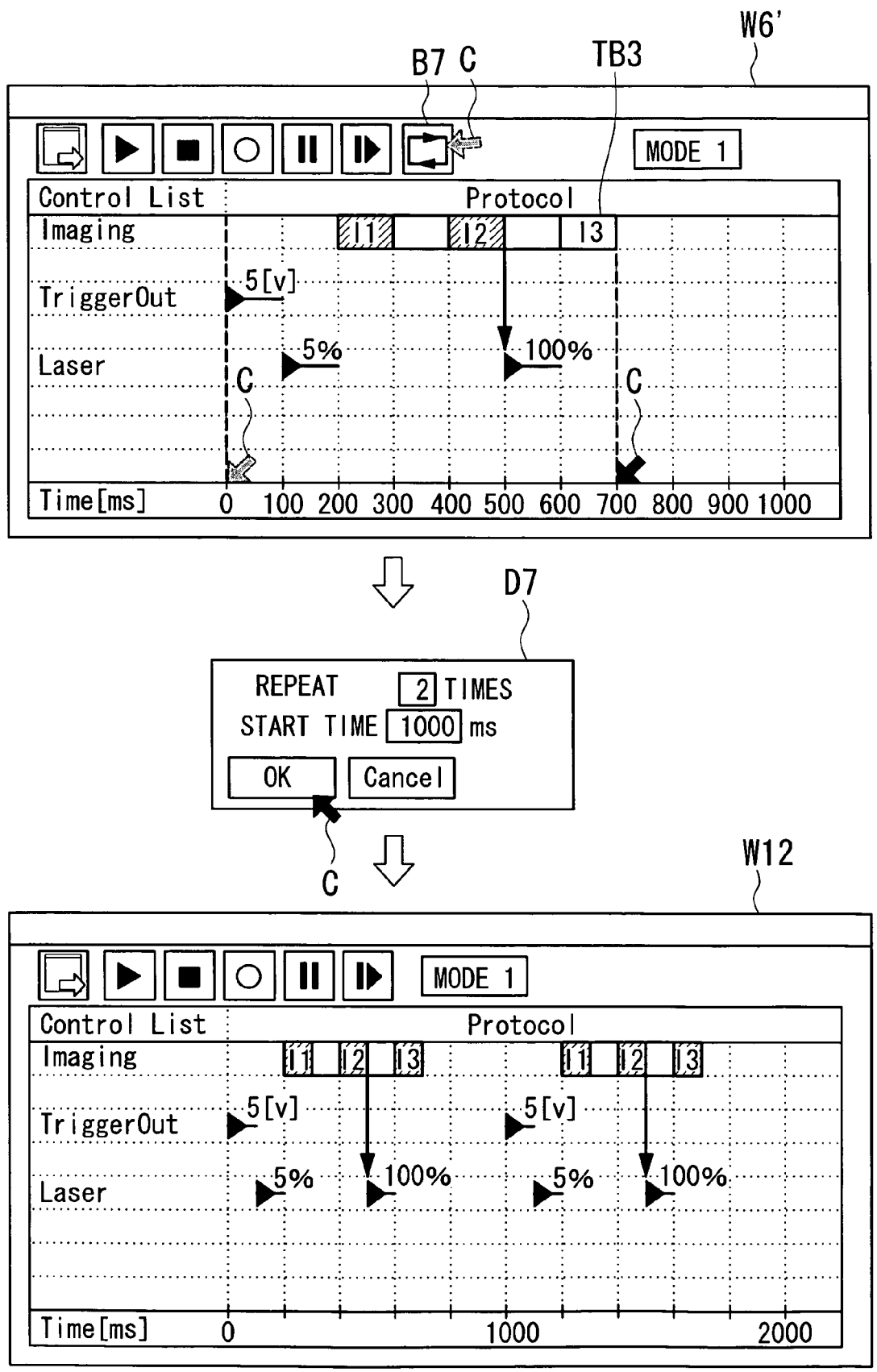
FIG. 34 illustrates an example of repetition setting of control values according to another modification of that shown in FIG. 33, wherein a loop button is provided.

To assign the above-described repeated processing area, as shown in FIG. 34, a loop button B7 for setting repeated processing is provided and the loop button B7 is clicked. For example, as described above, if the settings of the control values from 0 ms to 700 ms are repeated, the loop button B7 in the window W6', shown in FIG. 34, is clicked, then the 0-ms point, which is the start position for the repetition, is clicked with the mouse, and then the 700-ms point, which is the end position for the repetition, is clicked with the mouse. When the repeated processing area is set in such a manner, the setting dialog D7 is displayed, in the same way as described above. By performing the same settings as described above in the setting dialog D7, a window W12 reflecting the repetition is displayed.

Third Modification

Next, a third modification of this embodiment is described below. In this third modification, for each actual value, a pre-processing time before the acquisition time for actually acquiring image information and a post-processing time subsequent to the acquisition time for actually acquiring image information are obtained separately. The pre-processing time and the post-processing time are displayed and controlled separately.

The pre-processing time is preparation time for setting the light path and moving the objective lens after an acquisition command is input. The post-processing time is the processing time for saving the image information after the image information is acquired. For the actual control value, the pre-processing time and the post-processing time differ depending on the microscope apparatus 3 to be controlled. Therefore, the actual control value is separated into the pre-processing time, the processing time, and the post-processing time to acquire actual control information for the pre-processing time, the processing time, and the post-processing. Each set of acquired actual control information can be displayed separately. Then, by executing the above-described adjustment processing, the control value is corrected so that the acquisition time of image information includes the pre-processing time and the post-processing time.

For example, as shown in FIG. 35, at a task bar TB30 in a window W13, the acquisition time of the image I1 is set to 200 to 300 ms. When this control value is executed, a window W14 is displayed and the actual control values corresponding to the task bar TB30 are displayed as a task bar TB31. In the task bar TB31, the pre-processing time Pr1, the image I1, that is, the image information acquisition time, and the post-processing time Tr1 are displayed. In the task bar TB31, the pre-processing time Pr1 is 100 ms and the post-processing time Tr1 is 100 ms.

If the adjustment processing is performed in this display state, a corrected task bar TB32 is generated in a window W15, as shown in FIG. 36. The pre-processing time Pr1 in the task bar TB32 can be set so as to be separated from the image I1 (lower section of FIG. 36). The post-processing time Tr1 can also be separated and the control value can be set. Since the actual processing (image I1) and the pre-processing (Pr1) can be separated, for example, by providing an interval after the pre-processing is completed, the image acquisition processing can be started immediately without delay at the start time of the actual processing (image I1). In this way, the real-time performance of the experiment is improved. Moreover, since the actual processing (image I1) and the post-processing (Tr1) can be separated, for example, settings for performing completion processing of the image I1 after another processing (such as trigger out) are performed immediately after completing image acquisition of the image I1 are possible. Accordingly, a delay in a trigger output for the post-processing time of the image acquisition can be prevented.

In the description above, the actual processing time of the control items are acquired in the adjustment processing. It is preferable to store the processing time of the control items measured in advance in the computer 2 and to simultaneously display the task bars for the pre-processing time and the post-processing time in front of and after the task bar for the original control item by reading in the pre-processing time and the post-processing time corresponding to the control item to be set, when setting the task bars described in each embodiment. In this way, the pre-processing time and the post-processing time can be easily identified without performing the adjustment processing.

In this way, according to this modification, an experimental protocol can be generated by taking into consideration the pre-processing time and the post-processing time that are essential for the execution of the control items. Therefore, the real-time performance of the experiment is improved.

According to this embodiment, control settings are carried out with the computer 2 and the microscope apparatus 3 being connected to each other via the interface 4. However, an edit mode may be provided for carrying out control settings in advance with only the computer 2, without having the microscope apparatus 3 connected. By providing the edit mode, various control settings can be carried out at any time. In particular, if the computer 2 is portable, control values can be set and saved at any time while carrying around the portable computer 2.

According to this embodiment, the control setting and the control execution are carried out by moving the cursor C by operating the mouse 25A. However, the mouse 25A operation can be replaced by the keyboard 25B operation, or the control setting and the control execution may be carried out without displaying the cursor C. The input unit may be a touch panel input unit and may be integrated with the monitor as a single unit.

What is claimed is:

1. A laser scanning microscope apparatus comprising:
a graphical user interface configured to:
display one of: (i) a plurality of control items corresponding to control processes for controlling the microscope apparatus along a vertical axis and a time line along a horizontal axis, and (ii) the control items along the horizontal axis and the time line along the vertical axis, and
set control values for the control items and set respective control process starting times for the control values along the time line; and
a control unit which carries out control to obtain luminance information of a specimen by irradiating the specimen with a laser beam in accordance with the control values and the respective control process starting times set using the graphical user interface;
wherein the control processes comprise acquisition of image information;
wherein the graphical user interface is configured to display a first task bar for acquiring the image information along the time line every time setting of an image-acquisition control value is completed, wherein the image-acquisition control value comprises an acquisition interval of the image information and a number of image information frames to be acquired, and wherein the first task bar indicates an acquisition timing of the image information and has a length corresponding to an image acquisition time for acquiring the image information; and
wherein the graphical user interface is further configured to display a second task bar showing a preparation period before, along the time line, the first task bar, and to display a third task bar showing a completion period after, along the time line, the first task bar, wherein the second task bar and the third task bar can be spaced apart along the time line from the first task bar.

2. The laser scanning microscope apparatus according to claim 1, wherein:
the graphical user interface includes a table storing a processing time for each of the plurality of control items, and
the processing times of the plurality of control items corresponding to the set control values are read out from the table and set.

3. The laser scanning microscope apparatus according to claim 1, wherein the graphical user interface includes a time-display setting unit which modifiably sets at least one of a time scale of the time line and a screen display scale in a direction of the time line.

4. The laser scanning microscope apparatus according to claim 1, wherein the graphical user interface includes a laser setting unit which modifiably sets a laser control value including at least one of an output intensity of the laser beam and an emission time.

5. The laser scanning microscope apparatus according to claim 1, wherein the graphical user interface includes an image setting unit which modifiably sets the image-acquisition control value, and the image-acquisition control value includes the image acquisition time for acquiring the image information.

6. The laser scanning microscope apparatus according to claim 5, further comprising:
an image information display area which displays the image information,
wherein the graphical user interface links the image information display area and the image-acquisition control value and displays the image information related to the image-acquisition control value when the image-acquisition control value is set.

7. The laser scanning microscope apparatus according to claim 1, wherein the graphical user interface includes:
an actual-control-value acquisition unit which acquires an actual control value of a set control value at execution time, and
an actual-control-value display unit which displays the acquired actual control value.

8. The laser scanning microscope apparatus according to claim 7, wherein the graphical user interface includes a correction unit which corrects the set control value based on the actual control value acquired by the actual-control-value acquisition unit.

9. The laser scanning microscope apparatus according to claim 7, wherein:
the actual-control-value display unit separates the actual control value into detailed actual control values and displays the detailed actual control values, and
the graphical user interface includes a correction unit which corrects the set control value based on the detailed actual control values.

10. The laser scanning microscope apparatus according to claim 1, wherein the graphical user interface includes:
an execution mode for executing the control values by connecting to an object to be actually controlled, and
an edit mode for setting the control values without connecting to the object.

11. The laser scanning microscope apparatus according to claim 1, wherein the graphical user interface includes an actual-time display unit which displays an actual elapsed time when executing an object to be actually controlled.

12. The laser scanning microscope apparatus according to claim 1, wherein the graphical user interface is capable of setting a range of control values for carrying out a repetition process.

13. The laser scanning microscope apparatus according to claim 1, wherein the graphical user interface displays the image-acquisition control value, including at least the image acquisition time for acquiring the image information, as a task bar having a length that is changeable by dragging with a mouse, and
wherein the number of image information frames to be acquired can be increased or decreased without changing other portions of the image-acquisition control value.

14. The laser scanning microscope apparatus according to claim 1, wherein the graphical user interface includes:
a pausing unit which pauses a control operation of the control unit after the control operation is started,
a restart-time setting unit which sets a restart time of the control operation, and
a restart unit which restarts the control operation at the restart time set by the restart-time setting unit.

15. The laser scanning microscope apparatus according to claim 14, wherein the graphical user interface includes an editing unit for changing the control values when the pausing unit has paused the control operation.

16. The laser scanning microscope apparatus according to claim 14, wherein the graphical user interface displays a pause position indicator showing at least a pause position of the control operation paused by the pausing unit on the display of the control values set along the time line.

17. The laser scanning microscope apparatus according to claim 14, wherein the graphical user interface includes pausing as a control item.

18. The laser scanning microscope apparatus according to claim 1, wherein the control unit carries out control for starting processing of a second control value in synchronization with completion of processing of a first control value, wherein the first and second control values are included in the control values set by the graphical user interface and the first control value corresponds to a control item whose processing time is difficult to estimate in advance.

19. The laser scanning microscope apparatus according to claim 18, wherein, when a given control value corresponding to the control item whose processing time is difficult to estimate in advance is set, the graphical user interface displays the time line with a start point at a completion time of said given control value so as to set other control values to be processed after said given control value.

20. The laser scanning microscope apparatus according to claim 19, wherein the graphical user interface acquires an actual processing time after executing processing and redisplays all control values in a time scale whose start point is a processing start time.

21. The laser scanning microscope apparatus according to claim 1, wherein the control unit carries out control for starting processing of a second control value without being in synchronization with completion of processing of a first control value, wherein the first and second control values are included in the control values set by the graphical user interface and at least one of the first and second control values corresponds to a control item whose processing time is difficult to estimate in advance.

22. The laser scanning microscope apparatus according to claim 1, wherein the graphical user interface displays a linking symbol for linking a first processing and a second processing which starts after the first processing so that a completion time of the first processing is set as a starting time of the second processing.

23. A method for operating a scanning laser microscope which acquires luminance information of a specimen by irradiating the specimen with a laser beam, the method comprising:
displaying one of: (i) a plurality of control items corresponding to control processes for controlling the microscope along a vertical axis and a time line along a horizontal axis, and (ii) the control items along the horizontal axis and the time line along the vertical axis; and
setting control values for the control items and respective control process starting times for the control values along the time line,
wherein the displaying and the setting is performed using a graphical user interface;
wherein the control processes comprise acquisition of image information;
wherein the graphical user interface is configured to display a first task bar for acquiring the image information along the time line every time setting of an image-acquisition control value is completed, wherein the image-acquisition control value comprises an image acquisition interval of the image information and a number of image information frames to be acquired, and wherein the first task bar indicates an acquisition timing of the image information and has a length corresponding to an image acquisition time for acquiring the image information; and wherein the graphical user interface is further configured to display a second task bar showing a preparation period before, along the time line, the first task bar, and to display a third task bar showing a completion period after, along the time line, the first task bar, wherein the second task bar and the third task bar can be spaced apart along the time line from the first task bar.

24. The method according to claim 23, further comprising obtaining the luminance information of the specimen by irradiating the specimen with the laser beam in accordance with the control values and the respective control process starting times set using the graphical user interface, wherein starting of processing of a second control value is in synchronization with completion of processing of a first control value, wherein the first and second control values are included in the set control values and the first control value corresponds to a control item whose processing time is difficult to estimate in advance.

25. The method according to claim 23, further comprising: obtaining the luminance information of the specimen by irradiating the specimen with the laser beam in accordance with the control values and the respective control process starting times set using the graphical user interface, wherein starting of processing of a second control value is not in synchronization with completion of processing of a first control value, wherein the first and second control values are included in the set control values and at least one of the first and second control values corresponds to a control item whose processing time is difficult to estimate in advance.

26. A computer readable recording medium having stored thereon a computer readable program for operating a scanning laser microscope which acquires luminance information of a specimen by irradiating the specimen with a laser beam, the computer readable program instructing a computer to perform functions comprising:

displaying one of: (i) a plurality of control items corresponding to control processes for controlling the microscope along a vertical axis and a time line along a horizontal axis, and (ii) the control items along the horizontal axis and the time line along the vertical axis; and setting control values for the control items and respective control process starting times for the control values along the time line;

wherein the displaying and the setting is performed using a graphical user interface;

wherein the control processes comprise acquisition of image information;

wherein the graphical user interface is configured to display a first task bar for acquiring the image information along the time line every time setting of an image-acquisition control value is completed, wherein the image-acquisition control value comprises an acquisition interval of the image information and a number of image information frames to be acquired, and wherein the first task bar indicates an acquisition timing of the image information and has a length corresponding to an image acquisition time for acquiring the image and wherein the graphical user interface is further configured to display a second task bar showing a preparation period before, along the time line, the first task bar, and to display a third task bar showing a completion period after, along the time line, the first task bar, wherein the second task bar and the third task bar can be spaced apart along the time line from the first task bar.

27. A computer readable recording medium having stored thereon a computer readable control program for controlling a scanning laser microscope comprising a graphical user interface configured to display one of: (i) a plurality of control items corresponding to control processes for controlling the microscope along a vertical axis and a time line along a horizontal axis, and (ii) the control items along the horizontal axis and the time line along the vertical axis, and to set control values for the control items and set respective control process starting times for the control values along the time line, and a control unit which carries out control to obtain luminance information of a specimen by irradiating the specimen with a laser beam in accordance with the control values and the respective control process starting times set using the graphical user interface, wherein the computer readable control program controls a computer to perform functions comprising:

determining whether a set first control value corresponds to a control item whose processing time is difficult to estimate in advance, and when it is determined that the set first control value corresponds to the control item whose processing time is difficult to estimate in advance, carrying out control for starting processing of a second control value in synchronization with completion of processing of the first control value, wherein the first and second control values are included in the set control values;

wherein the control processes comprise acquisition of image information;

wherein the graphical user interface is configured to display a first task bar for acquiring the image information along the time line every time setting of an image-acquisition control value is completed, wherein the image-acquisition control value comprises an acquisition interval of the image information and a number of image information frames to be acquired, and wherein the first task bar indicates an acquisition timing of the image information and has a length corresponding to an image acquisition time for acquiring the image information; and wherein the graphical user interface is further configured to display a second task bar showing a preparation period before, along the time line, the first task bar, and to display a third task bar showing a completion period after, along the time line, the first task bar, wherein the second task bar and the third task bar can be spaced apart along the time line from the first task bar.

28. A computer readable recording medium having stored thereon a computer readable control program for controlling a scanning laser microscope comprising a graphical user interface configured to display one of: (i) a plurality of control items corresponding to control processes for controlling the microscope along a vertical axis and a time line along a horizontal axis, and (ii) the control items along the horizontal axis and the time line along the vertical axis, and to set control values for the control items and set respective control process starting times for the control values along the time line, and a control unit which carries out control to obtain luminance information of a specimen by irradiating the specimen with a laser beam in accordance with the control values and the respective control process starting times set using the graphical user interface, wherein the computer readable control program controls a computer to perform functions comprising:

determining whether a set first control value corresponds to a control item whose processing time is difficult to estimate in advance, and when it is determined that the set first control value corresponds to the control item whose processing time is difficult to estimate in advance, carrying out control for starting processing of a second control value without being in synchronization with completion of processing of the first control value, wherein the first and second control values are included in the set control values;

wherein the control processes comprise acquisition of image information;

wherein the graphical user interface is configured to display a first task bar for acquiring the image information along the time line every time setting of an image-acquisition control value is completed, wherein the image-acquisition control value comprises an acquisition interval of the image information and a number of image information frames to be acquired, and wherein the first task bar indicates an acquisition timing of the image information and has a length corresponding to an image acquisition time for acquiring the image information; and wherein the graphical user interface is further configured to display a second task bar showing a preparation period before, along the time line, the first task bar, and to display a third task bar showing a completion period after, along the time line, the first task bar, wherein the second task bar and the third task bar can be spaced apart along the time line from the first task bar.

* * * * *